US006803843B2

(12) United States Patent
Kato et al.

(10) Patent No.: US 6,803,843 B2
(45) Date of Patent: Oct. 12, 2004

(54) MOVABLE-BODY APPARATUS, OPTICAL DEFLECTOR, AND METHOD OF FABRICATING THE SAME

(75) Inventors: Takahisa Kato, Kanagawa (JP); Hidemasa Mizutani, Kanagawa (JP); Takayuki Yagi, Kanagawa (JP); Yasuhiro Shimada, Kanagawa (JP); Susumu Yasuda, Tokyo (JP); Takayuki Teshima, Kanagawa (JP); Futoshi Hirose, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/073,311

(22) Filed: Feb. 13, 2002

(65) Prior Publication Data

US 2002/0113675 A1 Aug. 22, 2002

(30) Foreign Application Priority Data

Feb. 22, 2001 (JP) .................................... 2001/047300
Jul. 11, 2001 (JP) .................................... 2001/211035
Sep. 14, 2001 (JP) .................................... 2001/278957

(51) Int. Cl.[7] ............................................. H01H 51/22
(52) U.S. Cl. ........................................ 335/78; 200/181
(58) Field of Search .................... 335/78–86, 124–128; 200/181; 257/414–427

(56) References Cited

U.S. PATENT DOCUMENTS 4,063,287 A    12/1977  Rosmalen
4,553,118 A  * 11/1985  Agatahama .................. 335/79
4,856,858 A     8/1989  Koike et al.
5,606,447 A     2/1997  Asada et al.
5,880,653 A  *  3/1999  Yamada et al. ............... 335/78
5,982,521 A    11/1999  Bessho et al.
6,175,451 B1    1/2001  Iriyama et al.
6,541,831 B2 *  4/2003  Lee et al. .................... 257/415

FOREIGN PATENT DOCUMENTS

DE      40 34 488      9/1991
JP      60-107017      6/1985
JP       7-175005      7/1995
JP       7-181414      7/1995
JP      2000-235152    8/2000

OTHER PUBLICATIONS

Jack W. Judy and Richard S. Muller, "Magnetically Actuated, Addressable Microstructures," Journal of Microelectromechanical Systems, vol. 6, No. 3 (1997).

* cited by examiner

Primary Examiner—Lincoln Donovan
(74) Attorney, Agent, or Firm—Fitzpatrick, Cella, Harper & Scinto

(57) ABSTRACT

The movable-body apparatus includes a support member, a movable body, an elastic supporting unit having a twisting longitudinal axis, and a driving unit for tilting the movable body in a tilting direction about the twisting longitudinal axis. The elastic supporting unit supports the movable body flexibly and rotatably about the twisting longitudinal axis relative to the support member. The driving unit includes a stationary portion provided apart from the movable body, and a moving core formed of a magnetic material, provided on a portion of the movable body, and has a face opposed to the stationary portion.

33 Claims, 20 Drawing Sheets

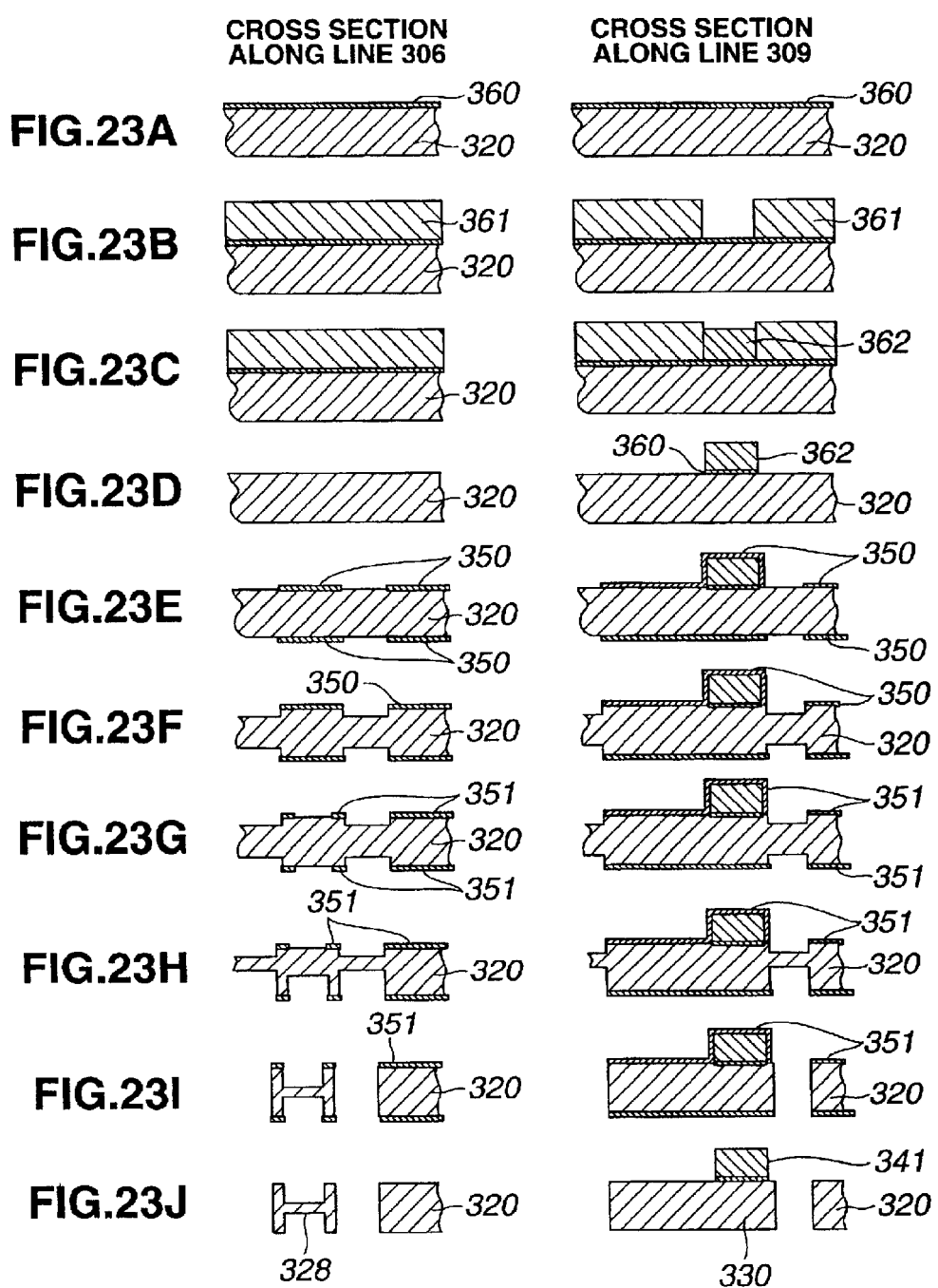

MOVABLE-BODY APPARATUS, OPTICAL DEFLECTOR, AND METHOD OF FABRICATING THE SAME

BACKGROUND OF THE INVENTION

1. Field of the Invention

The present invention relates to a movable-body apparatus with a movable body which can be reciprocally tilted about a twisting longitudinal axis, such as micro-actuators, and an optical deflector using an electromagnetic actuator, an optical instrument using the optical deflector, and a method of fabricating the movable-body apparatus.

2. Description of the Related Background Art

An optical deflector for defecting and scanning a light beam, such as a laser beam, is used in an optical instrument, such as a laser printer and a bar-code reader. As the optical deflector, there exist a polygonal mirror in which a polygon with side mirrors is rotated to reflect and deflect a light beam incident thereon, and a galvano-mirror in which a flat mirror is vibrated by an electromagnetic actuator.

However, an electromagnetic motor for rotating the mirror is needed in the polygonal mirror, and a driver coil formed by mechanical winding and a large-sized yoke for generating the magnetic field are needed in the galvano-mirror. Therefore, there exists the limitation to a decrease in the size of the mechanical elements mainly due to required output torque. Further, the size of an optical deflecting apparatus inevitably increases due to a required space in which component members are assembled.

Furthermore, where a light beam is scanned in a two-dimensional manner, a combination of the polygonal mirror and the galvano-mirror, or a combination of two polygonal mirrors is generally employed. However, when an accurate two-dimensional scanning should be attained, it is necessary to arrange the mirrors such that scanning directions are orthogonal to each other, and hence, their optical adjustment is very complicated.

Apparatuses disclosed in Japanese Patent Application Laid-Open Nos. 7(1995)-175005 and 7(1995)-181414 are known as optical deflectors proposed to solve the above-described disadvantages. In those apparatuses, semiconductor producing techniques are applied and micromachining techniques for integrally fabricating micro-machines on semiconductor substrates are used.

FIG. 1 illustrates an example disclosed in Japanese Patent Application Laid-Open No. 7(1995)-175005. In a galvano-mirror 1001 of FIG. 1, a planar movable plate 1005 with a light reflective mirror 1008 is rotatably supported relative to a silicon substrate 1002 by a pair of torsion springs 1006 formed of a monolithic silicon. There are further arranged an upper-side glass 1003, a lower-side glass 1004, a flat coil 1007, contact pads 1009, and permanent magnets 1010A, 1011A, 1010B and 1010C. In this structure, the driver coil 1007 for generating the magnetic field is disposed on the periphery of the movable plate 1005, and paired permanent magnets 1010A and 1010B; 1011A and 1010C are disposed on upper and lower surfaces of the semiconductor substrate 1002, respectively, through upper and lower glass substrates 1003 and 1004, such that electrostatic fields are applied only to portions of the flat coil 1007 parallel to the twisting longitudinal axis of the torsion springs 1006.

In this optical deflector, when a current is caused to flow through the flat coil 1007, the Lorentz force appears in a direction determined by the Fleming's left-hand rule due to the current flowing through the flat coil 1007 and the magnetic flux generated by the magnets 1010A and 1010B; 1011A and 1010C. Thus, a moment for rotating the movable plate 1005 occurs. Upon rotation of the movable plate 1005, a spring reaction force occurs due to the spring rigidity of the torsion springs 1006. A static displacement of the movable plate 1005 is established based on an equilibrium relationship between the Lorentz force and the spring reaction force. When an alternate current is caused to continuously flow in the flat coil 1007, the movable plate 1005 with the reflective mirror 1008 is reciprocally tilted in a vibratory manner, and a light beam reflected by the mirror 1008 is hence scanned.

The optical deflector of FIG. 1, however, has the following disadvantage. When a vibratory angle of the light beam is to be increased at the scanning time, distances between the upper and lower glass substrates 1003 and 1004 and the movable plate 1005 must be enlarged. Then, distances between the permanent magnets 1010A and 1010B; 1011A and 1010C and the flat coil 1007 increase, and hence, the magnetic flux by the permanent magnet weakens at the location of the flat coil 1007. As a result, a large current is required to flow through the flat coil 1007 for the driving of the movable plate 1005, and it hence becomes difficult to construct an optical deflector which can achieve a large deflection angle and reduce a consumption electric power. Further, since the permanent magnets 1010A and 1010B; 1011A and 1010C for generating the external magnetic field must be disposed outside the movable plate 1005, an external size of the entire device inevitably increases. The movable plate 1005 provided with the flat coil 1007 also increases in size.

Further, in the deflector of FIG. 1, the wiring of the flat coil 1007 for driving the movable plate 1005 is formed on the torsion springs 1006. Accordingly, there is a possibility that a metal material of the wiring is damaged and disconnected due to the repetitive torsional motion of the torsion springs 1006 at the time of driving the movable plate 1005. Such disconnection of the wiring greatly limits the life of the device.

FIG. 2 illustrates an example disclosed in Japanese Patent Application Laid-Open No. 7(1995)-181414. In a structure of FIG. 2, a minute driving source 2006 for generating a minute vibration of a piezoelectric oscillator is provided at an end of an elastic support 2003 which has two elastic deformation modes of bending mode $\theta_B$ and torsion deformation mode $\theta_T$. The other end of the elastic support 2003 is shaped into an oscillator 2002 with a light reflective surface 2007. In this structure, there are further arranged a vibration input portion 2004, a mirror support 2008, and a plate 2009.

In the optical deflector of FIG. 2, flexure vibration and torsional vibration of the elastic support 2003 are caused by the vibration from the driving source 2006. Since there are characteristic resonance vibration modes of the flexure vibration and the torsional vibration in accord with the construction of the device, the elastic support 2003 resonates at the resonance frequency when the vibration source 2006 generates a vibration including frequency components of those two resonance frequencies. Thus, the oscillator 2002 with the reflective surface 2007 can scan a reflected light beam in a two-dimensional manner.

In the optical deflector of FIG. 2, however, scanning rate and waveform of the oscillated light beam are limited since the driving and optical scanning cannot be achieved at frequencies other than the resonance frequency. Further, the driving manner, in which the attitude of the reflective surface 2007 is maintained, cannot be performed.

Furthermore, in the optical deflector of FIG. 2, the elastic support 2003 is oscillated in two deformation modes of bending mode and torsion mode. Therefore, in the case of a two-dimensional scanning, a resultant force of bending stress and shear stress appears, and a large internal stress is hence generated in the elastic support 2003, in contrast to the case of a single stress. As a result, the elastic support 2003 is easy to break, and the life of the device is greatly limited.

In addition to the above, the fabrication of an electromagnetic actuator on a substrate, such as silicon, has been recently tried by using semiconductor processes. When the electromagnetic actuator is fabricated using the semiconductor process, a unit of a stationary core, a moving core and an electromagnetic coil can be integrally fabricated. Accordingly, no joining and bonding processes is needed, and those elements can be aligned with a high precision. Further, mass-production is possible, and the cost can hence be decreased.

Japanese Patent Application Laid-Open No. 2000-235152 discloses an example in which the electromagnetic actuator formed on a substrate is applied to an optical deflector. FIG. 3 illustrates the optical deflector disclosed in this Japanese reference. This is directed to a torsion beam optical deflector, and used as a deflector for two-dimensionally scanning a laser beam. The deflector includes an inner y-axis-directional deflector 3003, an outer x-axis-directional deflector 3004 and an outermost frame 3001. The inner y-axis-directional deflector 3003 includes a substrate with grooves 3002, a movable plate 3006 rotatably supported by axis portions 3005 and having a hard magnetic thin layer on its surface, a pair of thin electromagnet portions 3007 for rotatably driving the movable plate 3006, and a mirror 3008 provided on the movable plate 3006. Formation planes of the movable plate 3006 and the thin electromagnets 3007 are slightly shifted from each other in a thickness direction.

The movable plate 3006 is oscillated by Coulomb forces appearing between magnetic fields generated by an alternate current at 60 kHz, which is the structural resonance frequency of the y-axis-directional deflector 3003, flowing in the electromagnet portions 3007 and by the hard magnetic thin layer on the movable plate 3006. Light incident on the mirror 3008 is thus deflected. Consumption electric power can be reduced due to a driving method using the mechanical resonance. The outer x-axis-directional deflector 3004 has the same structure as that of the inner y-axis-directional deflector 3003, and also is driven similarly. Driving frequencies are 60 kHz (y-direction) and 60 Hz (x-direction), and the displacement angle is ±13.6° (y-direction).

In the optical deflector of FIG. 3, however, the cross-sectional area of a core of the electromagnet 3007 is limited in size since this core is composed of a thin layer deposited by sputtering, though a high speed operation can be obtained. Therefore, the magnetic flux is inevitably saturated when a large current is caused to flow in the thin electromagnet portion 3007, and it is hence difficult to further increase the displacement angle. Further, the shift between the formation planes of the movable plate 3006 and the thin electromagnet portions 3007 in the thickness direction is small, so a further increase in the displacement angle is limited also for this reason.

SUMMARY OF THE INVENTION

It is an object of the present invention to provide a movable-body apparatus with a movable body which can be reciprocally tilted about a twisting longitudinal axis, such as micro-sensors for sensing mechanical amounts, micro-actuators, and optical micro-deflectors, which can be reduced in size and cost, and have an excel lent durability and a versatile performance, and in which a large tilt displacement of the movable body is possible, an energy efficiency can be increased, and the movable body can be operated at a high speed. It is further an object of the present invention to provide an optical instrument including the movable-body apparatus, and a method of fabricating the movable-body apparatus.

The present invention is generally directed to a movable-body apparatus including a first support member, a movable body, an elastic supporting unit having a twisting longitudinal axis, and a driving unit for tilting the movable body in a tilting direction about the twisting longitudinal axis. The elastic supporting unit supports the movable body flexibly and rotatably about the twisting longitudinal axis relative to the first support member. The driving unit includes a stationary portion provided apart from the movable body, and a moving core formed of a magnetic material, provided on a portion of the movable body, and has a face opposed to the stationary portion.

More specifically, the following constructions can be preferably adopted based on the above fundamental construction.

The stationary portion of the driving unit typically includes a stationary core formed of a soft magnetic material and a coil wound on the stationary core. Further, the elastic supporting unit includes a pair of torsion springs disposed along the twisting longitudinal axis opposingly with the movable body being interposed.

The moving core and the stationary core can have faces opposed to each other in an approximately parallel relationship with a spacing being interposed between the opposed faces of the moving core and the stationary core, respectively, the faces can be shifted from each other in a direction perpendicular to the tilting direction, and the faces can be arranged such that a superimposing area between the faces viewed from a direction perpendicular to the faces can be changed as the movable body is tilted. Thus, there can be achieved an electromagnetic actuator in which a magnetic force can be generated in a direction perpendicular to the support member. When the thickness of the moving core in the tilting direction is appropriately set, a large magnetic force can be generated over a large stroke. Further, since no electric wiring is formed on the movable body, the possibility of disconnection of the electric wiring is greatly decreased, leading to a prolonged life of the apparatus. The moving core and the stationary core can readily constitute a serial magnetic circuit through the spacing.

The moving core can be formed of either a soft magnetic material or a permanent magnet of a hard magnetic material. When the moving core is formed of a soft magnetic material, the driving principle is as follows. Magnetic poles of the soft magnetic material are not determined, and the soft magnetic material is attracted into a magnetic flux generated by the stationary core, such that a cross-sectional area where the soft magnetic material crosses the magnetic flux increases. The movable body is thus driven. Upon cease of the magnetic flux, the soft magnetic material is released from the magnetic flux.

When the moving core is formed of a hard magnetic material, the driving principle is as follows. Magnetic poles of the hard magnetic material are determined, and the soft magnetic material is driven by an attractive force between different magnetic poles or a repulsive force between common magnetic poles. When the moving core is formed of a greatly magnetized hard magnetic material having a large coercive force, the magnetic force can be increased by not increasing the turn coil of the coil and a current applied to the coil. A compact movable-body apparatus with a small consumption electric power, such as an electrostatic actuator, can be obtained.

The moving core can be provided on a side of a side surface of the movable body parallel to and remote from the twisting longitudinal axis. The moving core can also be provided on the side surface itself. In such an arrangement, the freedom in location of the driving unit can be increased, and a magnetic circuit with a small leakage of the magnetic flux can be constructed. Hence, the consumption electric power can be reduced, and the energy efficiency can be increased. Further, a magnetic force perpendicular to the support member can be readily generated, so that the tilting stroke of the movable body can be increased.

The stationary core can have opposite end faces with the moving core being interposed between the opposite end faces. In such a structure, a leakage of the magnetic flux can be reduced, and the magnetic force can be effectively generated. Further, since the magnetic force is determined by a permeance of the spacing between the stationary core and the moving core, a large magnetic force can be effectively generated in such a structure in which a longitudinal side of the moving core can all be used as the width of the magnetic path.

The stationary core can have opposite end faces lying on a common plane and opposed to the face of the moving core. In such a structure, a structure with no fear that the movable body interferes with the stationary core can be readily constructed, and an optical deflector with a large deflection angle can be readily attained.

The moving core can be provided on an edge port ion of the movable body extending parallel to the twisting longitudinal axis. In such a structure, the moving core can be located at a portion of the maximum moment arm, and hence, an effective torsional oscillation can be achieved.

The moving core can be provided on an edge portion of the movable body extending perpendicularly to the twisting longitudinal axis. In such a structure, the opposed faces of the moving core and the stationary core can be readily caused to interfere with each other irrespective of the configuration of the stationary core, and hence, an optical deflector with a large deflection angle can be readily achieved.

The moving core can be provided on a protruding portion of the movable body extending perpendicularly to the twisting longitudinal axis. In such a structure, the moment arm can be further increased, and a large torque can be generated.

In the above three structures, the moving core is arranged close to the stationary core in the magnetic circuit. Therefore, undesired magnetic forces in directions other than the tilting direction of the movable body are unlikely to occur. In contrast, where a moving core is also formed in a portion on a side opposite to the side of the stationary core about the twisting longitudinal axis (typically where a moving core is formed over all of the movable body), the magnetic force from the stationary also acts on the portion of the moving core on the opposite side of the stationary core. Accordingly, a torque in a direction opposite to a direction of a torque generated between the stationary core and a portion of the moving core on the side of the stationary core undesirably occurs. Thus, in those structures, the generated magnetic force can be effectively employed to drive the movable body.

Further, when the movable body is driven in a vibratory fashion, the moving core is subjected to alternate magnetization by the stationary core, and hence, hysteresis loss and eddy current loss (so-called iron loss) are generated. Those losses undesirably lower the efficiency of the apparatus. In a structure in which the moving core is provided solely at a location close to the stationary core, those losses can be greatly reduced, so that apparatuses with a high efficiency and a small consumption electric power can be readily achieved.

Furthermore, those losses result in heat generation in the moving core and the movable body, which causes thermal deformation thereof. Particularly, where the moving core is formed over all of the movable body, a larger deforming stress is generated in the movable body due to a difference in the coefficient of thermal expansion between the moving core and thew movable body. In contrast thereto, in the structure of the present invention, since the moving core is provided on a portion of the movable body, heat generation is unlikely to occur. Further, deformation of the movable body due to the heat generation can be reduced since the interface area between the moving core and the stationary core having different coefficients of thermal expansion is decreased. Moreover, the moment of inertia of the movable body can be decreased, so that the movable body can be readily driven at a high rate.

The moving core can be provided on each edge portion of the movable body about the twisting longitudinal axis, and the stationary core with the coil wound thereon can be provided on each side of the twisting longitudinal axis. Thus, the moving core and the stationary core constitutes a serial magnetic circuit on each side of the twisting longitudinal axis. In this case, a couple of forces in the tilting directions of the movable body can be generated by using attractive and repulsive forces occurring between the moving cores and appropriately magnetized stationary cores. Accordingly, the torque can be simultaneously applied to both end portions of the movable body, respectively, and hence, the driving force can be increased. Further, a structure, in which a displacement in directions other than the tilting direction is unlikely to occur, can be obtained. In addition, even when the movable body is driven at a frequency other than the resonance frequency by alternately energizing the coils, the light deflection can be efficiently performed without decreasing a scanning angle.

When a pair of stationary cores are provided at a location of the moving core provided on each edge portion of the movable body, each stationary core can share the driving function in each one direction of a two-dimensional driving of the movable body.

The moving core can be provided on one edge portion of the movable body, and the stationary core with the coil wound thereon can be provided on one side of the twisting longitudinal axis. In this structure, the moment of inertia required to drive the movable body can be reduced. Further, the size of the entire apparatus can be reduced since the area occupied by the stationary core with the coil can be decreased.

The elastic supporting means can be composed of two sets of paired springs which are capable of torsional and flexure vibrations, whose longitudinal axes are orthogonal to each other and which elastically support the movable body in a two-dimensional torsional manner, and four moving cores can be provided on the movable body in a crisscross pattern extending in directions shifted by 45 degrees from each adjacent longitudinal axis of the paired springs. Further, four stationary cores with the coils can be provided such that each corresponding moving core and stationary core constitute a serial magnetic circuit. In such a structure, the movable body can be tilted in a two-dimensional manner by selectively energizing the four coils.

The movable-body apparatus can further include a second support member for supporting the stationary core, and a spacer support member for bonding the first support member and the second support member to each other in a predetermined relationship with the spacer support member being interposed. In such a structure, the movable body, the elastic supporting unit, and the moving core can be integrally formed in the first support member by using semiconductor producing technique, and the coil and the stationary core can also be integrally formed in the second support member by using semiconductor producing technique. And, those support members can be assembled by using the spacer substrate with appropriate alignment mechanisms. Accordingly, a narrow spacing between the moving core and the stationary core can be precisely set, so that the apparatus can be made compact and the magnetic force for driving the movable body can be increased.

At least one of the elastic supporting means and the movable body can be formed of a single crystal silicon. In such a structure, its internal loss can be reduced, and a high energy efficiency can be attained. Further, a structure with a large mechanical Q-value can be achieved when the resonance driving is employed. The single crystal silicon is readily available, and excellent in mechanical characteristics (i.e., physical strength and durability are great, life is long, and specific gravity is small).

The moving core can be formed of a ferromagnetic material. In such a structure, the movable body can be driven with good controllability. Further, the moving core can be formed of a hard magnetic material. In such a structure, an energy efficiency can be increased.

The moving core can also be formed of an alloy including iron and nickel. In such a structure, the core can be composed of a magnetic material having a large saturation magnetization, a small residual magnetization, and a small loss. Accordingly, an ideal magnetic circuit can be constructed, and an energy efficiency can be increased.

The moving core, the elastic supporting means, and the first support member can be integrally formed in a common substrate. In such a structure, no assemblage process is needed, and the fabrication cost can be reduced. Further, no alignment between the movable body and the support member in needed.

The stationary portion of the driving means typically includes a stationary core fixed to the first support member, and a coil wound on the stationary core. In such a structure, the movable body can be controlled by changing a current flowing through the coil.

Each of the stationary core and the moving core can include a comb-shaped portion, and the comb-shaped portions of the stationary core and the moving core can be arranged in a meshing manner with spacing being interposed between the comb-shaped portions. In such a structure, the magnetic force for driving the movable body does not decrease inversely proportional to the square of the spacing gap, and can be determined by the current flow in the coil, so that the movable body can be readily control led. Further, the maximum area of opposed faces between the moving core and the stationary core can be increased, and hence, the magnetic force can be enlarged.

The frame member can include an inner frame member and an outer frame member, the movable body can include an inner movable body and an outer movable body which is the inner frame member for supporting the inner movable body through a first elastic supporting unit and is supported by the outer frame member through a second elastic supporting unit. In this structure, the inner movable body is supported flexibly and rotatably about a first twisting longitudinal axis of the first elastic supporting unit, and the outer movable body is supported flexibly and rotatably about a second twisting longitudinal axis of the elastic supporting means. If necessary, more than two movable bodies can be flexibly and rotatably supported in such a manner (i.e., in a so-called gimbals fashion). The twisting longitudinal axes typically extend forming an angle of 90 degrees.

The movable-body apparatus can further include a light deflecting element provided on the movable body, and the movable-body apparatus can thus be constructed as an optical deflector. The light deflecting element can be a light reflective surface, a diffraction grating, or a lens. When the reflective surface is used, the apparatus can be readily fabricated, and the movable body can be lightened. When the diffraction grating is used, an incident light beam can be deflected as a plurality of beams. When the lens is used, the deflection angle can be increased.

The movable-body apparatus can be constructed as an actuator for actuating the movable body, or a mechanical-amount sensor with a sensing unit for detecting a relative displacement between the support member and the movable body. A conventional sensor can be used as the sensing unit.

The present invention is also directed to a movable-body apparatus which includes a support member; a movable body; an elastic supporting unit which has a twisting longitudinal axis, and supports the movable body flexibly and rotatably about the twisting longitudinal axis relative to the support member; and a driving unit for tilting the movable body in a tilting direction about the twisting longitudinal axis, which includes a stationary core formed of a soft magnetic material with a coil wound on the stationary core and provided apart from the movable body, and a moving core formed of a magnetic material and provided on a portion of the movable body. The moving core and the stationary core have faces opposed to each other in an approximately parallel relationship with a spacing being interposed between the opposed faces of the moving core and the stationary core, respectively, the faces are shifted from each other in a direction perpendicular to the tilting direction, and the faces are arranged such that a superimposing area between the faces viewed from a direction perpendicular to the faces can be changed as the movable body is tilted.

The present invention is also directed to a movable-body apparatus which includes a support member; a movable body; an elastic supporting unit which has a twisting longitudinal axis, and supports the movable body flexibly and rotatably about the twisting longitudinal axis relative to the support member; and a driving unit for tilting the movable about the twisting longitudinal axis, which includes a stationary core formed of a soft magnetic material with a coil wound on the stationary core and provided apart from the movable body, and a moving core formed of a magnetic material and provided on a side of a side surface of the movable body.

The present invention is also directed to a scanning type display which includes the above-discussed optical deflector, a modulatable light source, a control unit for controlling modulation of the modulatable light source and operation of the movable body of the optical deflector in an interlocking manner, and a display screen on which the beam of light from the deflector is projected. The size and cost of such a display apparatus can be reduced.

The present invention is also directed to an image forming apparatus which includes the above-discussed optical deflector, a modulatable light source, a control unit for controlling modulation of the modulatable light source and operation of the movable body of the optical deflector in an interlocking manner, and an image forming surface on which the beam of light from the deflector is projected. The size and cost of such an image forming apparatus can be reduced.

The present invention is also directed to a method of fabricating the above movable-body apparatus, which includes a step of forming the light deflecting unit on a substrate, a step of forming the moving core on the substrate, and a step of simultaneously forming the elastic supporting unit, the movable body and the first support member in the substrate. The method can further include a step of forming a groove for alignment on the substrate by etching. In such a method, the light deflecting unit is formed in the groove of the first support member formed by the etching process, and after the moving core is formed on the first support member, the elastic supporting unit and the movable body are simultaneously formed. The apparatus can be precisely fabricated by such a method using micromachining techniques.

The above method can further include a step of fabricating a second support member provided with the stationary portion of the driving unit and a groove for alignment, a step of fabricating a spacer support member provided with grooves for alignment on both surfaces thereof, and a step of bonding the first support member to the second support member with the spacer support member being interposed while establishing alignments of the alignment grooves on the first support member and the second support member with the corresponding alignment grooves on the spacer support member through fibers in the alignment grooves.

The step of forming the moving core on the substrate can include a step of forming an electrode for electroplating on the substrate, a step of forming a photosensitive layer on the substrate with the electrode for electroplating, a step of partially exposing the photosensitive layer by using high-energy radiation light, a step of developing and removing a predetermined portion of the photosensitive layer by utilizing a difference in an etching rate between exposed and unexposed portions of the photosensitive layer, and a step of electroplating metal in the removed predetermined portion. The moving core can be precisely formed at a desired location by such a method.

Light at a wavelength less than 400 nm is preferably used as the high-energy radiation light. When the high-energy radiation light is ultraviolet radiation at a wavelength less than 400 nm which is used in an ordinary photolithography, the method is preferable in fabrication time and cost required for photolithography apparatus and process. In this case, when SU-8 (product of MicroChem Corp.) or the like is used as a photosensitive material, a die having a thickness of about several hundred micrometers can be formed.

In the step of simultaneously forming the elastic supporting-unit, the movable body and the first support member in the substrate, they can be formed in the substrate by etching. A smooth structure of a single crystal silicon can be formed by such a method, and an apparatus having ideal processed surfaces can be obtained.

In the step of simultaneously forming the elastic supporting-unit, the movable body and the first support member in the substrate by etching, the substrate can be etched only from its surface without the moving core formed thereon. The apparatus can be formed without damaging the moving core formed in the previous step.

The present invention is also directed to a method of fabricating the above movable-body apparatus which includes a step of forming a groove in a substrate, a step of forming the moving core in the groove, and a step of forming the elastic supporting unit and the movable body in a portion of the substrate such that the support member is formed in the other portion of the substrate. In such a method, the elastic supporting unit and the movable body can be simultaneously formed, and no alignment between the elastic supporting unit and the support member is needed. Further, no assemblage process is needed, and the fabrication cost can be reduced.

The elastic supporting unit and the movable body can be formed by reactive ion etching. The elastic supporting unit and the movable body can be stably formed with high precision by this method.

The elastic supporting unit and the movable body can be formed by etching using an alkaline solution. The elastic supporting unit and the movable body can be stably formed with high precision by an anisotropic etching method utilizing a difference in the etching rate of silicon crystal faces. Further, since the etching rate of this etching method is faster than that of the reactive ion etching, processing time and cost can be reduced.

The moving core can be formed by electroplating. The moving core can be speedily and thickly formed, compared with vacuum-evaporation and sputtering.

These advantages, as well as others will be more readily understood in connection with the following detailed description of the preferred embodiments of the invention in connection with the drawings.

BRIEF DESCRIPTION OF THE DRAWINGS

FIG. 6 is a schematic perspective view illustrating the driving principle of the first embodiment and the like.

FIGS. 23A to 23J are cross-sectional views illustrating a method of fabricating a single crystal silicon thin plate of the seventh embodiment.

DESCRIPTION OF THE PREFERRED EMBODIMENTS

Figure 1:
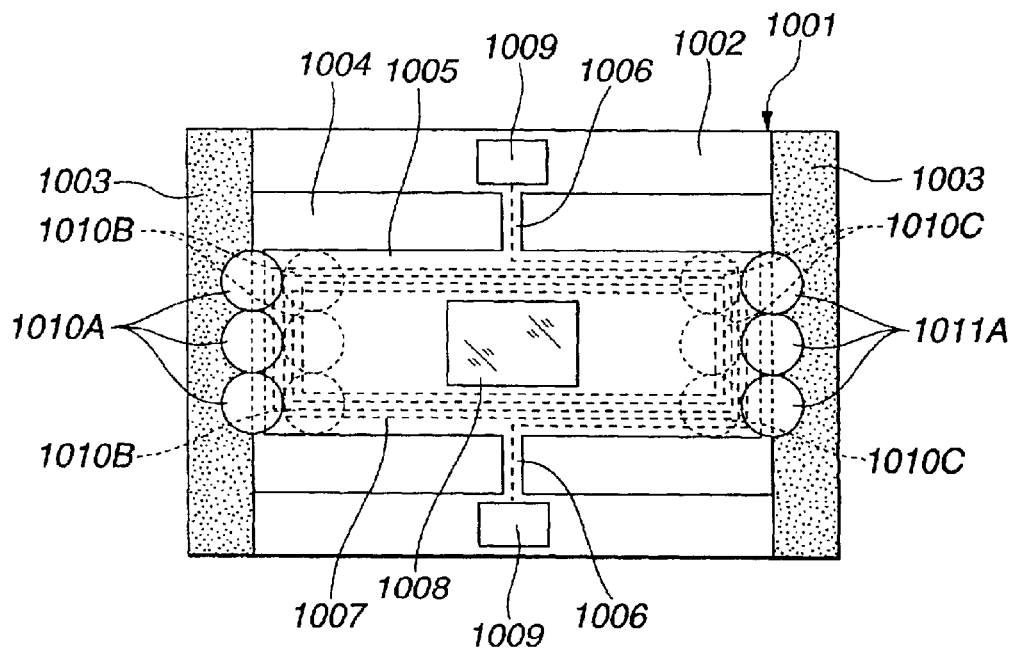
FIG. 1 is a plan view illustrating a first conventional optical deflector.
Figure 2:
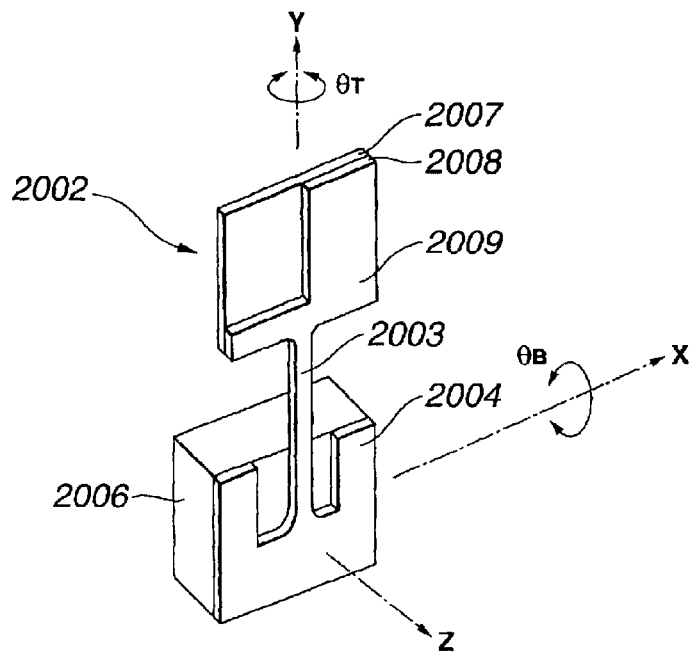
FIG. 2 is a perspective view illustrating a second conventional optical deflector.
Figure 3:
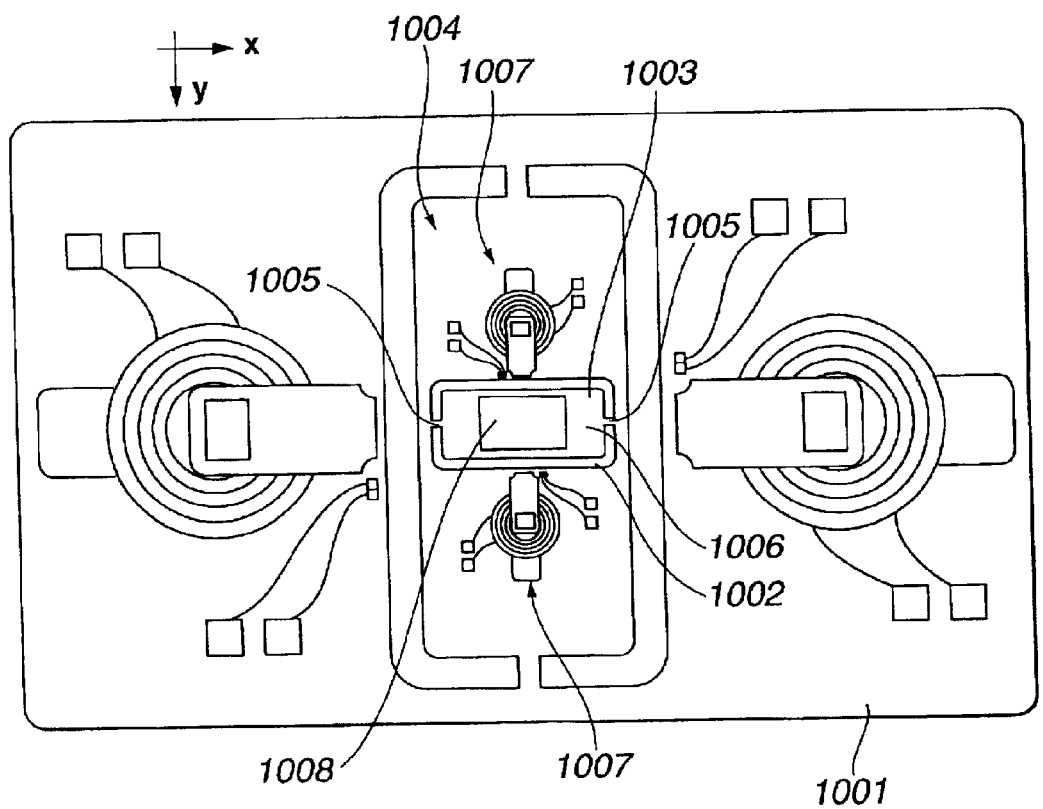
FIG. 3 is a plan view illustrating a third conventional optical deflector.

An optical deflector of a first embodiment according to the present invention will be described with reference to FIGS. 4 to 6.

The structure of an optical deflector 1 of the first embodiment will be described. The structure of a substrate will be initially described. As illustrated in FIG. 5 of a cross-sectional view taken along a line A—A of FIG. 4, the deflector 1 has a three-layer structure in which first and second support substrates 2 and 4 of semiconductor are bonded to upper and lower surfaces of a spacer substrate 3, respectively. The bonding is conducted while establishing the alignment between fibers 14 in alignment grooves 13C on the second support substrate 4 and alignment grooves 13B on the spacer substrate 3 and the alignment between fibers 14 in alignment grooves 13B on the spacer substrate 3 and alignment grooves 13A on the first support substrate 2. As illustrated in FIGS. 4 and 6, a movable plate 5 is elastically supported by a pair of torsion springs 6 relative to the frame-shaped first support substrate 2 such that the movable plate 5 can be oscillated in a torsional fashion.

A reflective surface 8 is provided on one surface of the movable plate 5, and moving cores 7A and 7B are provided on the other surface of the movable plate 5. Those movable plate 5, reflective surface 8, moving cores 7A and 7B, and torsion springs 6 are integrally formed by micromachining techniques using semiconductor producing techniques. The moving cores 7A and 7B are formed in a planar form on opposite end portions of the movable plate 5 parallel to the twisting longitudinal axis of the torsion springs 6.

Figure 4:
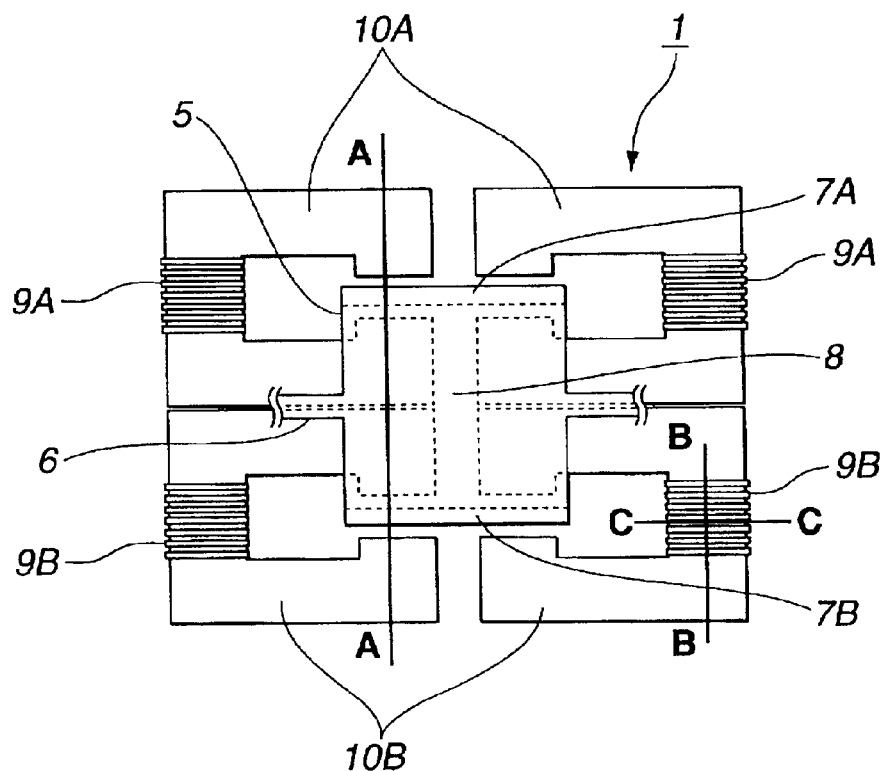
FIG. 4 is a plan view illustrating an optical deflector of a first embodiment according to the present invention.
Figure 5:
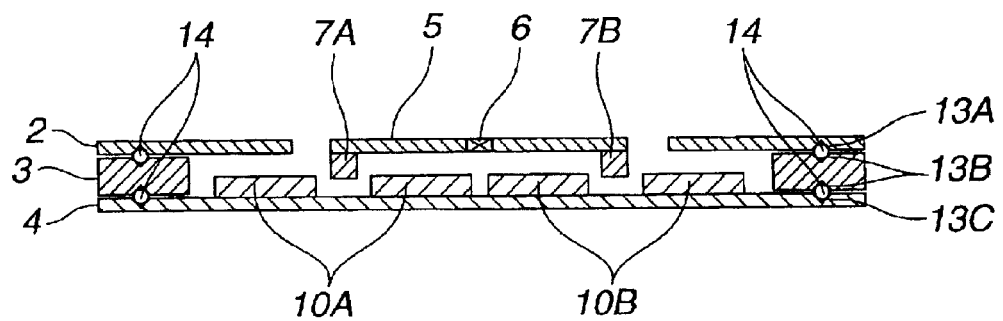
FIG. 5 is a cross-sectional view illustrating the first embodiment.

As illustrated in FIG. 4, portions of the second support substrate 4 on opposite sides of the twisting longitudinal axis of the torsion springs 6 are provided with two C-shaped stationary cores 11A and 10B and coils 9A and 9B wound thereon for generating magnetic fluxes flowing along directions parallel to the substrate 4, respectively. The coils 9A and 9B are connected to current sources (not shown), respectively, and the motion of the movable plate 5 is controlled by these current sources. The C-shaped stationary cores 10A and 10B and the coils 9A and 9B are also integrally formed on the substrate 4 by micromachining techniques.

A fabrication method of this embodiment will be described. In the deflector of this embodiment, the first support substrate 2, the spacer substrate 3, and the second support substrate 4 are fabricated by separate processes, and these substrates are bonded while establishing the alignment therebetween using the fibers 14 and the alignment grooves 13A, 13B and 13C.

Fabrication methods of the movable plate 5, the reflective surface 8, the moving cores 7A and 7B, and the torsion springs 6 integrally formed in the first support substrate 2 will be described with reference to FIGS. 7A to 7F. A (100) silicon substrate is used as the first support substrate 2.

Mask layers 101 of silicon oxide are initially formed on both surfaces of the substrate 2 by thermal oxidization, respectively. Portions of the mask layer 101, at which the alignment grooves 13A are to be formed, are then removed by wet etching using a buffered hydrofluoric acid with a photoresist being used as a mask. After the photoresist is removed, the above portions of the mask layer 101 are exposed to an etching liquid. A silicon anisotropic etching is thus performed using a tetramethyl ammonium hydroxide solution, such that V-shaped grooves of the alignment grooves 13A are formed at predetermined locations, as illustrated in FIG. 7A.

After the formation of the alignment grooves 13A, the mask layers 101 on both surfaces of the substrate 2 are removed by using the buffered hydrofluoric acid again. After an appropriate cleansing process, a seed electrode layer 111 is formed on the surface (top surface) having the alignment grooves 13A. The electrode layer 111 for electroplating is formed by the vacuum-evaporation of chrome (Cr) and copper (Cu). The reflective layer 8 of aluminum (Al) is vacuum-evaporated on the surface (bottom surface) without any alignment grooves. A photoresist layer 102 is then deposited to perform the pattering of the reflective layer 8, as illustrated in FIG. 7B.

The photoresist layer 102 is exposed and developed, and the Al reflective layer is patterned by wet etching using a solution for eroding Al (e.g., a mixture liquid of $H_3PO_4$, $HNO_3$, $CH_3COOH$, and $H_2O$). The reflective layer 8 is thus formed on the bottom surface. Here, it is preferable to form a protective layer on the seed electrode layer 111 to protect it. A photoresist layer 112 is then deposited on the surface. In this embodiment, SU-8 suitable for a thick deposition is used as the photoresist layer 112. The photoresist layer 112 is exposed, developed, and patterned. Portions formed by removing the photoresist layer 112 in this step are female dies for forming the moving cores 7A and 7B, as illustrated in FIG. 7C.

Figures 7A, 7B, 7C, 7D, 7E, 7F:
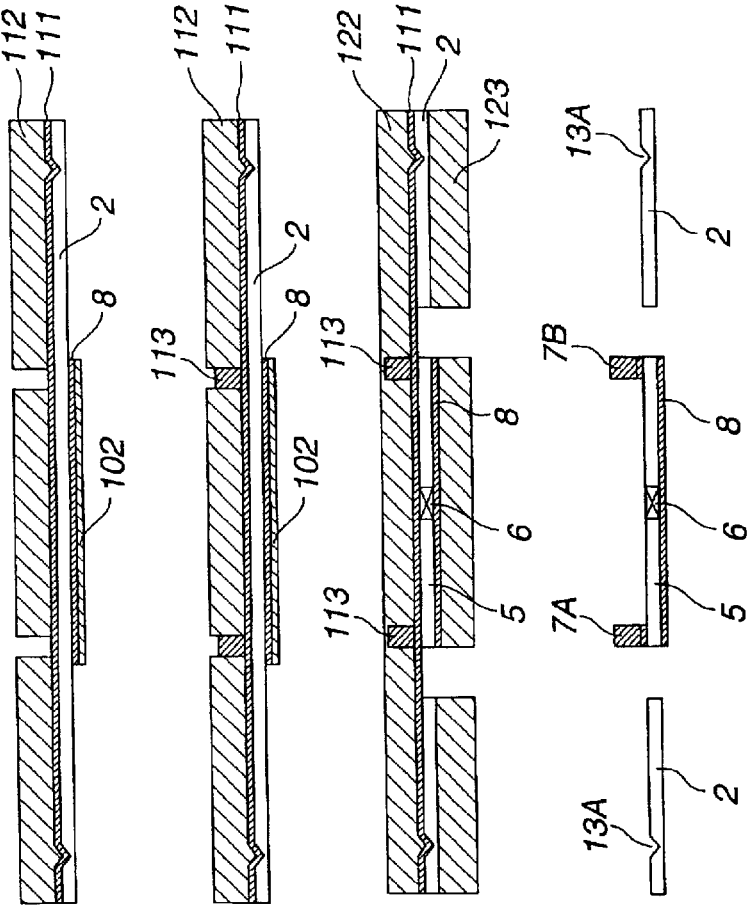
FIGS. 7A to 7F are cross-sectional views illustrating a method of fabricating a first support substrate of the first embodiment.

A permalloy layer 113 is then electroplated while a voltage is applied to the seed electrode layer 111, as illustrated in FIG. 7D. After the permalloy layer 113 is electroplated to a desired thickness, the photoresist layer 112 on the top surface and the protective layer 102 on the bottom surface are removed, and a polyimide is deposited as a protective layer 122 for the permalloy layer 113. After the formation of the protective layer 122 of polyimide, a photoresist layer 123 is deposited on the bottom surface as a mask for use in the next step. The photoresisit layer 123 is then exposed, developed, and patterned for forming the movable plate 5 and the torsion springs 6. The silicon 2 is then dry-etched by using an ICP-RIE (Inductively Coupled Plasma-Reactive Ion Etching) apparatus, such that the movable plate 5 and the torsion springs 6 are formed as illustrated in FIG. 7E.

Finally, the remaining protective layer 122, the seed electrode layer 111, and the photoresist layer 123 are removed. Thus, the movable plate 5, the reflective surface 8, the movable cores 7A and 7B, the torsion springs 6, and the alignment grooves 13A are integrally formed in the first support substrate 2, as illustrated in FIG. 7F.

A method of fabricating the coils 9A and 9B, and the stationary cores 10A and 10B integrally formed on the second support substrate 4 will be described.

In the first embodiment, the coils 9A and 9B, and the stationary cores 10A and 10B are fabricated by forming lower coil wiring 114, side coil wiring 115 and upper coil wiring 116 in this order using micromachining techniques. The method will be described with reference to FIGS. 8A to 8L. Left and right portions of FIGS. 8A to 8L are B—B and C—C cross-sectional views of FIG. 4, respectively.

Figure 8A:
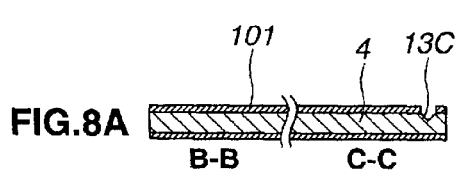
FIGS. 8A to 8L are cross-sectional views illustrating a method of fabricating a second support substrate of the first embodiment.

A (100) silicon substrate is used as the second support substrate 4. Mask layers 101 of silicon oxide are formed on both surfaces of the second support substrate 4 by thermal oxidation, respectively. Portions of the mask layer 101, at which the alignment grooves 13C are to be formed, are then removed by wet etching using a buffered hydrofluoric acid with a photoresist being used as a mask. A silicon anisotropic etching is then performed using a tetramethyl ammonium hydroxide solution, such that V-shaped grooves of the alignment grooves 13C are formed at predetermined locations, as illustrated in FIG. 8A.

Figure 8G:
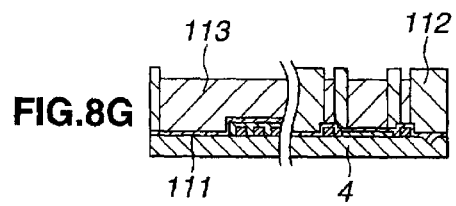
Figure 8B:
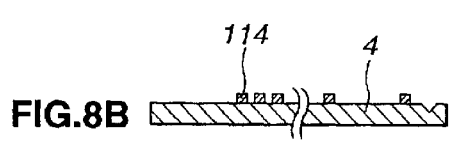

After the formation of the alignment grooves 13C, the mask layers 101 on both surfaces of the substrate 4 are removed by using the buffered hydrofluoric acid again. Then, copper (Cu) is vacuum-evaporated, and patterned as the lower coil wiring 114, as illustrated in FIG. 8B. A polyimide is deposited, and patterned as an insulating layer 117 between the lower wiring and the core, as illustrated in FIG. 8C.

Figure 8H:
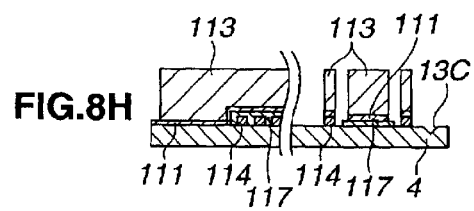
Figure 8C:
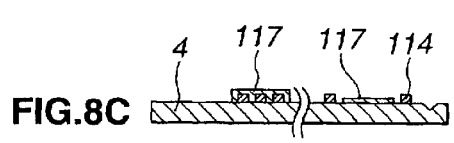
Figure 8I:
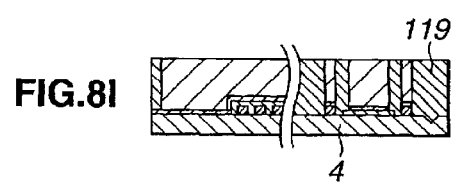
Figure 8D:
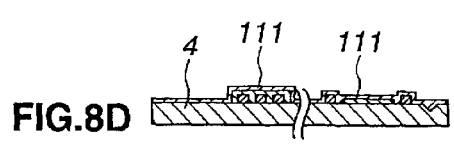

Chrome (Cr) and gold (Au) are then vacuum-evaporated as a seed electrode layer 111 for electroplating, as illustrated in FIG. 8D. A photoresist layer 112 is then deposited as illustrated in FIG. 8E. In this embodiment, the SU-8 suitable for a thick deposition is used.

The photoresist layer 112 is then exposed, developed, and patterned. Portions formed by removing the photoresist layer 112 in this step are female dies for forming the stationary cores 10A and 10B and the side coil wiring 115, as illustrated in FIG. 8F. A permalloy layer 113 is then electroplated while a voltage is applied to the seed electrode layer 111, as illustrated in FIG. 8G.

The photoresist layer 112 and the seed electrode layer 111 are then removed by the dry-etching, as illustrated in FIG. 8H. An epoxy resin 119 is deposited, and its upper surface is mechanically polished and flattened, as illustrated in FIG. 8I.

Figure 8J:
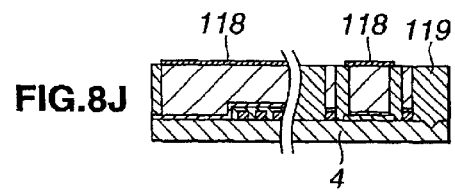
Figure 8E:
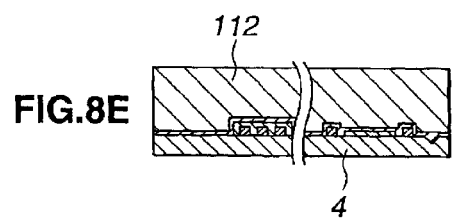
Figure 8K:
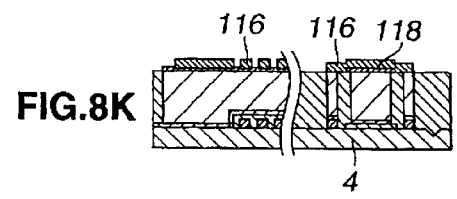
Figure 8F:
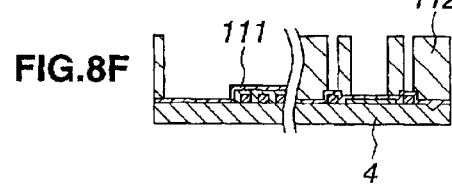

A polyimide is deposited on the stationary core 11A, and patterned as an insulating layer 118 between the upper wiring and the core, as illustrated in FIG. 8J. Copper (Cu) is then vacuum-evaporated on the insulating layer 118, and patterned as the upper coil wiring 116, as illustrated in FIG. 8K.

Figure 8L:
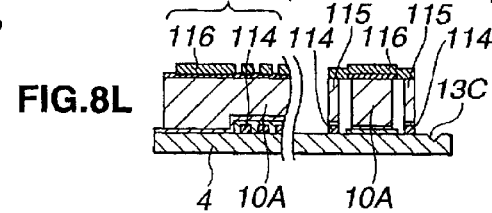

Finally, the epoxy resin 119 is removed as illustrated in FIG. 8L. Thus, the alignment grooves 13C, the coils 9A and 9B, and the stationary cores 10A and 10B are integrally formed in the second support substrate 4.

A method of fabricating the spacer substrate 3 will be described with reference to FIGS. 9A to 9C.

A (100) silicon substrate is used as the spacer substrate 3. Mask layers 101 of silicon oxide are formed on both surfaces of the spacer substrate 3 by thermal oxidation, respectively. Portions of the mask layer 101, at which the alignment grooves 13B are to be formed, are then removed by wet etching using a buffered hydrofluoric acid with a photoresist being used as a mask. Similarly, the photoresist process and etching process are repeated on the other surface of the spacer substrate 3.

Figure 9A:
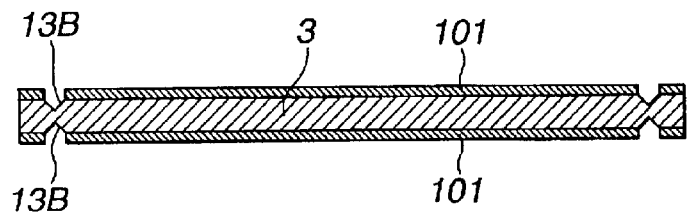
FIGS. 9A to 9C are cross-sectional views illustrating a method of fabricating a spacer support substrate of the first embodiment.
Figure 9B:
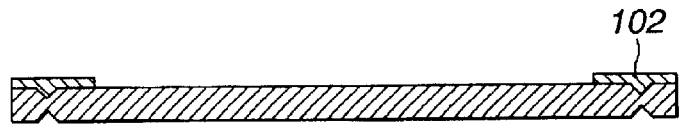
Figure 9C:

A silicon anisotropic etching is then performed using a tetramethyl ammonium hydroxide solution, such that V-shaped grooves of the alignment grooves 13B are formed at predetermined locations, as illustrated in FIG. 9A.

A photoresist layer 102 is then deposited on a surface of the substrate 3 as a mask for use in the next step. The photoresist layer 102 is exposed, developed, and patterned as illustrated in FIG. 9B. The silicon is then dry-etched by using an ICP-RIE apparatus, such that a penetrating hole is formed as illustrated in FIG. 9C. Thus, the alignment grooves 13B, and the penetrating hole are formed in the spacer substrate 3.

The first and second substrates 2 and 4 are bonded to the spacer substrate 3 in the following manner. After the fibers 14 are placed in the alignment grooves 13C on the second support substrate 4, the spacer substrate 3 is placed on the second support substrate 4 such that the alignment grooves 13B of the spacer substrate 3 are disposed on the fibers 14. An adhesive is then put into the alignment grooves with the fibers 14, and hardened. Likewise, after the fibers 14 are placed in the alignment grooves 13B on the upper surface of the spacer substrate 3, the first support substrate 2 is placed on the spacer substrate 3 such that the alignment grooves 13A of the first support substrate 2 are disposed on the fibers 14. An adhesive is again put into the alignment grooves with the fibers 14, and hardened. Thus, the first and second substrates 2 and 4 are bonded to the upper and lower surfaces of the spacer substrate 3 with a desired alignment precision, respectively. The optical deflector with a three-layer structure of the first embodiment is thus obtained.

The operation principle of the thus-fabricated deflector with the C-shaped stationary cores will be described.

The oscillation of the movable plate 5 about the twisting longitudinal axis is attained by a magnetic attraction of the moving cores 7A and 7B. The reflective surface 8 on the movable plate 5 is continuously oscillated such that a light beam incident thereon is deflected and scanned.

The description will be made with reference to FIG. 6 which illustrates the moving core 7A, the coil 9A, and the stationary core 10A on one side of the twisting longitudinal axis of the torsion springs 6.

When a current flow from the current source occurs in the coil 9A, a magnetic flux in a direction of an arrow φ appears in the stationary core 10A. The magnetic flux circulates in the magnetic circuit in the order of the stationary core 11A, a spacing 12B, the moving core 7A, a spacing 12A, and the stationary core 11A. The moving core 7A is attracted in a direction F perpendicular to the movable plate 5, i.e., a direction in which an overlap amount between the moving core 7A and the stationary core 11A increases.

Here, the permeance $P_g(x)$ of the spacing between the moving core 7A and the stationary core 11A is given by $$P_g(x) = \mu_0 w \{(t-(x+x_0))/(R+2\delta) + (x+x_0)/2\delta\} \quad (1),$$

where $\mu_0$ is the permeability of vacuum, δ is the distance of the spacing, t is the thickness (the length in the direction F) of the stationary core, R is the thickness of the moving core, w is the width (the length in the direction φ) of the moving core, x is the displacement of the moving core, and $x_0$ is the overlap length in a neutral state.

When the permeance of the magnetic circuit not including the spacing is assumed to be P, potential energy W of the entire magnetic circuit is written as $$W = \frac{1}{2} \cdot (1/P + 1/P_g)^{-1} (Ni)^2 \quad (2),$$

where N is the turn number of the coil 9A, and i is the current flowing through the coil 9A.

When the moving core 7A and the stationary core 10A are formed of a magnetic material having a sufficiently large relative permeability, P can be assumed to be approximately infinite, compared to $P_g$. Therefore, a force F generated at the spacing portion is given by $$F = -dW/dx = -\mu_0 w/2 \cdot \{1/(2\delta) - 1/(R+2\delta)\}(Ni)^2 \quad (3)$$

It can be seen from relation (3) that the generated force F is proportional to the turn number N of the coil and the square of the current i in the optical deflector with the C-shaped stationary core.

Figure 6:
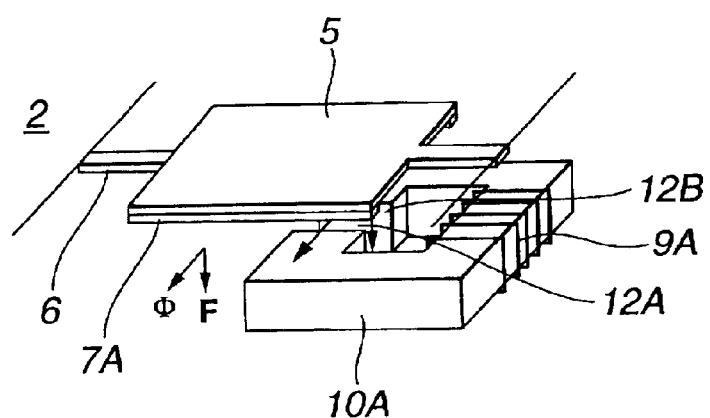

The moving core 7A is provided at a location of the movable plate 5, which has a moment arm as illustrated in FIG. 6, so that a torque for tilting the movable plate 5 is generated by the generated force F.

On the other hand, the torsion springs 6 are twisted when the movable plate 5 is tilted about the twisting longitudinal axis. The relationship between a spring reaction force F' of the torsion springs 6 generated by that twist and a displacement angle ψ of the movable plate 5 is given by $$\psi = (F'L1)/(2GI_p) \quad (4),$$

where G is the transverse elastic coefficient, L is the distance between a center of the torsion spring and a point of force, l is the length of the torsion spring, and $I_p$ is the polar moment of inertia. The movable plate 5 is tilted to an attitude at which the generated force balances with the spring reaction force F'. Therefore, when F in relation (3) is substituted into F' in relation (4), it can be seen that the displacement angle ψ of the movable plate 5 is proportional to the square of the current i flowing through the coil 9A.

Thus, since the displacement angle ψ of the movable plate 5 can be controlled by controlling the current i flowing through the coil 9A, the reflection direction of light incident on the reflective surface 8 can be freely controlled. Light can be scanned by the continuous repetitive operation.

In the optical deflector of this embodiment, the reflective surface 8 has a size of 1 mm×1 mm. The maximum deflection angle is approximately 35 degrees, and the resonance frequency of the deflector is approximately 22 kHz. In the above description, the movable plate 5 and the torsion bars 6 are formed by the silicon dry-etching using the ICP-RIE apparatus, but the elastic support portions, or the torsion springs 6 can be formed by anisotropic etching using an alkaline solution, such as KOH, such that each of them has a trapezoidal cross section defined by (100) and (111) planes. In this embodiment, an upper side of the trapezoid (the upper side is shorter than its lower side) is 20 μm, and the longitudinal length of the torsion spring 6 is 5000 μm, for example.

Further, the thickness of the movable plate 5 and the torsion springs 6 is equal to the thickness of the first support substrate 2 (i.e., 200 μm) in the above-discussed fabrication method, but it is possible to decrease the thickness of the torsion springs 6 by a method in which portions of the torsion springs 6 are etched down by anisotropic etching prior to the formation of the torsion springs 6. In this case, the longitudinal length of the torsion spring 6 can be reduced.

Furthermore, it is possible that a (110) silicon substrate is used as the first support substrate 2, and the torsion spring 6 is formed by the anisotropic etching such that its cross section has a rectangular shape defined by (110) and (111) planes. In this case, it is possible that the thickness of the movable plate 5 and the torsion springs 6 is equal to the thickness of the first support substrate 2 (i.e., 200 μm), length and width of the torsion spring 6 are respectively set to 3100 μm and 75 μm, for example, and the thus-fabricated deflector has the same maximum deflection angle and resonance frequency as described above. Embodiments later described can also have sizes similar to the above-discussed.

In the structure of this embodiment, no electric wiring is needed on movable portions, and the moving cores 7A and 7B can be effectively disposed solely on portions, where the moment arm is maximum, such that a generated torque can be increased and the movable portion can be lightened. Further, since four C-shaped stationary cores 10A and 10B are arranged in this embodiment, an occupation area of the coils can be reduced and magnetic circuits with a small leakage of the magnetic flux can be achieved. Accordingly, the optical deflector can be a small durable deflector.

In this embodiment, two C-shaped stationary cores 10A and 10B with the coils 9A and 9B are arranged on each side of the twisting longitudinal axis of the torsion springs 6 as illustrated in FIG. 4, but an optical deflector can also be constructed by arranging a single stationary core on each side of the twisting longitudinal axis.

Furthermore, the reflective surface 8 is used as a light deflecting element in FIG. 4, but it can be replaced by a reflection-type diffraction grating. In this case, deflected light is diffracted light, and hence, a plurality of deflected light beams can be obtained from a single beam. This replacement is also possible in embodiments later described.

Figure 10:
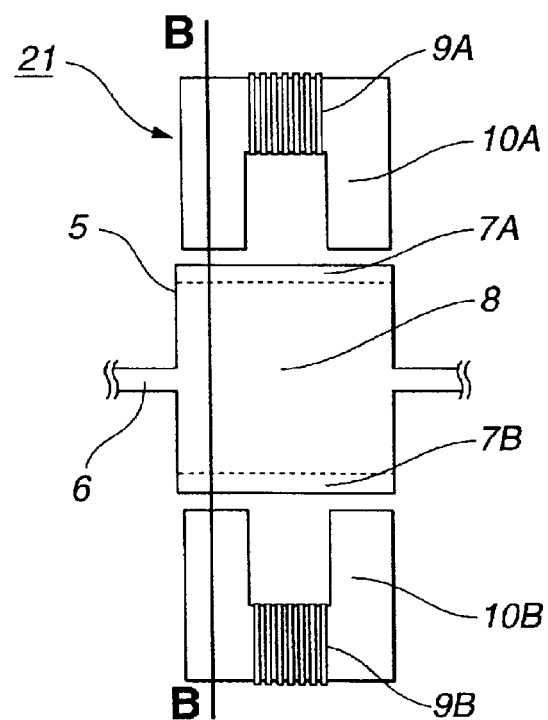
FIG. 10 is a plan view illustrating an optical deflector of a second embodiment according to the present invention.
Figure 11:
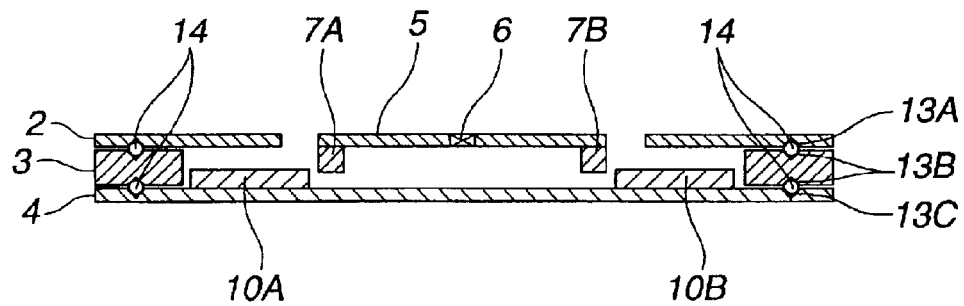
FIG. 11 is a cross-sectional view illustrating the second embodiment.

An optical deflector of a second embodiment will be described with reference to FIGS. 10 and 11. FIG. 10 is a plan view, and FIG. 11 is a cross-sectional view taken along a line B—B of FIG. 10.

The structure of an optical deflector 21 of the second embodiment also has a three-layer structure in which first and second support substrates 2 and 4 of semiconductor are bonded to upper and lower surfaces of a spacer substrate 3, respectively. The bonding is also conducted while establishing the alignment using fibers 14 and alignment grooves 13A, 13B and 13C.

As illustrated in FIG. 10, a movable plate 5 is elastically supported by a pair of torsion springs 6 such that the movable plate 5 can be oscillated in a torsional fashion. A reflective surface 8 is provided on one surface of the movable plate 5, and moving cores 7A and 7B are provided on the other surface of the movable plate 5. Those movable plate 5, reflective surface 8, moving cores 7A and 7B and torsion springs 6 are integrally formed by micromachining techniques using semiconductor producing techniques. The moving cores 7A and 7B are formed in a planar form on opposite sides of the movable plate 5 parallel to the twisting longitudinal axis of the torsion springs 6.

As illustrated in FIG. 10, portions of the second support substrate 4 on opposite sides of the twisting axis of the torsion springs 6 are provided with two U-shaped stationary cores 10A and 10B and coils 9A and 9B wound thereon for generating magnetic fluxes flowing along directions parallel to the substrate 4, respectively. The motion of the movable plate 5 is controlled by current sources connected to the coils 9A and 9B. The U-shaped stationary cores 10A and 10B and the coils 9A and 9B are also integrally formed on the substrate 4 by micromachining techniques.

The structure of the deflector 21 of the second embodiment is the same as that of the first embodiment except for the shape of the stationary core 10A. Therefore, the second embodiment can be fabricated by the same methods as those of the first embodiment. In the thus-fabricated optical deflector of this embodiment, the U-shaped stationary cores 10A and 10B are formed such that the movable plate 5 does not interfere with the stationary cores 10A and 10B when the movable plate 5 is tilted. Accordingly, an optical deflector with a large deflection angle can be readily attained.

The operation principle of the thus-fabricated deflector with the U-shaped stationary core will be described with reference to FIG. 12 which illustrates the moving core 7A, the coil 9A, and the stationary core 10A on one side of the twisting longitudinal axis of the torsion springs 6.

When a current flow from the current source occurs in the coil 9A, a magnetic flux appears in the stationary core 10A. The magnetic flux circulates in a direction of an arrow φ in the magnetic circuit in the order of the stationary core 10A, a spacing 12A, the moving core 7A, a spacing 12B, and the stationary core 10A. The moving core 7A is attracted in a direction F perpendicular to the movable plate 5, i.e., a direction in which an overlap amount between the moving core 7A and the stationary core 10A increases.

Here, the permeance $P_g(x)$ of the spacing between the moving core 7A and the stationary core 10A is given by $$P_g(x) = \mu_0 w \cdot (x+x_0)/(2\delta) \quad (5),$$

where $\mu_0$ is the permeability of vacuum, $\delta$ is the distance of the spacing, w is the width of the stationary core, x is the displacement of the moving core, and $x_0$ is the overlap length in a neutral state.

When the permeance of the magnetic circuit not including the spacing is assumed to be P, potential energy W of the entire magnetic circuit is written by relation (2) described above.

When the moving core 7A and the stationary core 10A are formed of a magnetic material having a sufficiently large relative permeability, P can be assumed to be approximately infinite, compared to $P_g$. Therefore, a force F generated at the spacing portion is given by $$F = -dW/dx = -\mu_0 w/(2\delta) \cdot (Ni)^2 \quad (6)$$

It can also be seen from relation (6) that the generated force F is proportional to the turn number N of the coil and the square of the current i in the optical deflector with the U-shaped stationary core.

Figure 12:
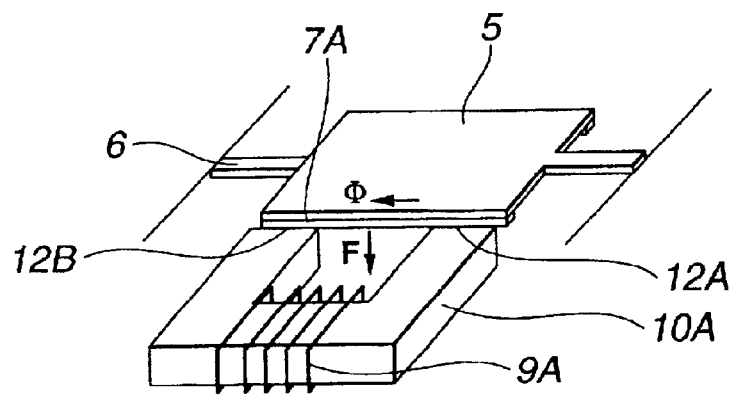
FIG. 12 is a schematic perspective view illustrating the driving principle of the second embodiment.

Also in the second embodiment, the moving core 7A is provided at a location of the movable plate 5, which has a moment arm as illustrated in FIG. 12, so that a torque for tilting the movable plate 5 is generated by the generated force F.

According to the same principle as that of the first embodiment described above, since the displacement angle ψ of the movable plate 5 can be controlled by controlling the current flowing through the coil 9A, the reflection direction of light incident on the reflective surface 8 can be freely controlled also in the second embodiment. Light can be scanned by the continuous repetitive operation.

Figure 13:
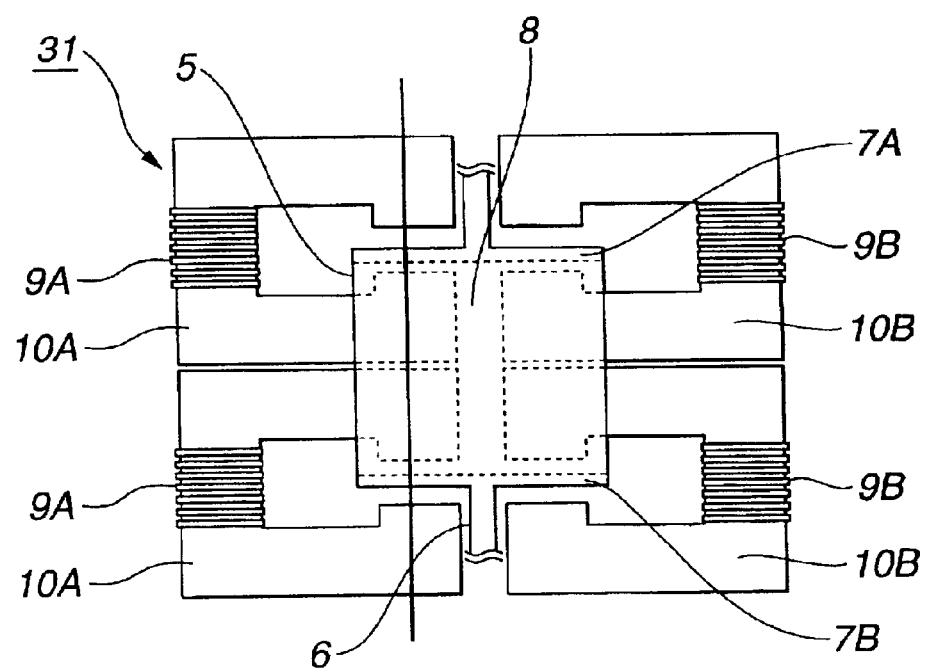
FIG. 13 is a plan view illustrating an optical deflector of a third embodiment according to the present invention.
Figure 14:
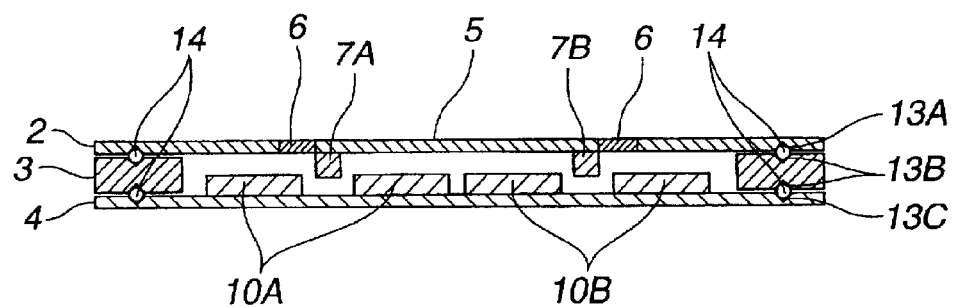
FIG. 14 is a cross-sectional view illustrating the third embodiment.

An optical deflector of a third embodiment will be described with reference to FIGS. 13 and 14. FIG. 13 is a plan view, and FIG. 14 is a cross-sectional view taken along a line B—B of FIG. 13.

The structure of an optical deflector 31 of the third embodiment has the same fundamental structure as that of the first embodiment. First support substrate 2, spacer substrate 3, and second support substrate 4 are integrally formed by micromachining techniques. The third embodiment differs from the first embodiment in the relationship between the twisting direction of the torsion springs 6 and locations of the moving cores 7A and 7B. In the deflector 31 of the third embodiment, the moving cores 7A and 7B are formed in a planar form on sides of the movable plate 5 perpendicular to the twisting longitudinal axis of the torsion springs 6, as illustrated in FIG. 13. The deflector 31 of this embodiment can also be fabricated by the same methods as those of the first embodiment.

Also in the thus-fabricated optical deflector 31 of this embodiment, C-shaped stationary cores 10A and 10B are formed such that the moving cores 7A and 7B on the movable plate 5 do not interfere with the stationary cores 10A and 10B when the movable plate 5 is tilted. Accordingly, an optical deflector with a large deflection angle can be readily obtained.

The operation principle of the thus-fabricated deflector 31 of this embodiment is basically the same as that of the first or second embodiment. The movable plate 5 is driven by a magnetic force in a direction in which an overlap area between opposed faces of the moving cores 7A and 7B and the stationary core 10A or 10B, in which the magnetic flux is generated, increases.

In the structure illustrated in FIG. 13, two C-shaped stationary cores 10A and 10B and two coils 9A and 9B are provided on portions of the second support substrate 4 on opposite sides of the twisting longitudinal axis of the torsion springs 6, respectively (totally four). However, even when a single stationary core and a single coil are provided on portions of the second support substrate 4 on opposite sides of the twisting longitudinal axis of the torsion springs 6, respectively (totally two), an optical deflector operable in the same manner can be obtained. Further, even when two stationary cores 10A or 10B are provided on a portion of the second support substrate 4 on one side of the twisting longitudinal axis of the torsion springs 6, respectively (totally two), an optical deflector operable in the same manner can also be obtained.

Figure 15:
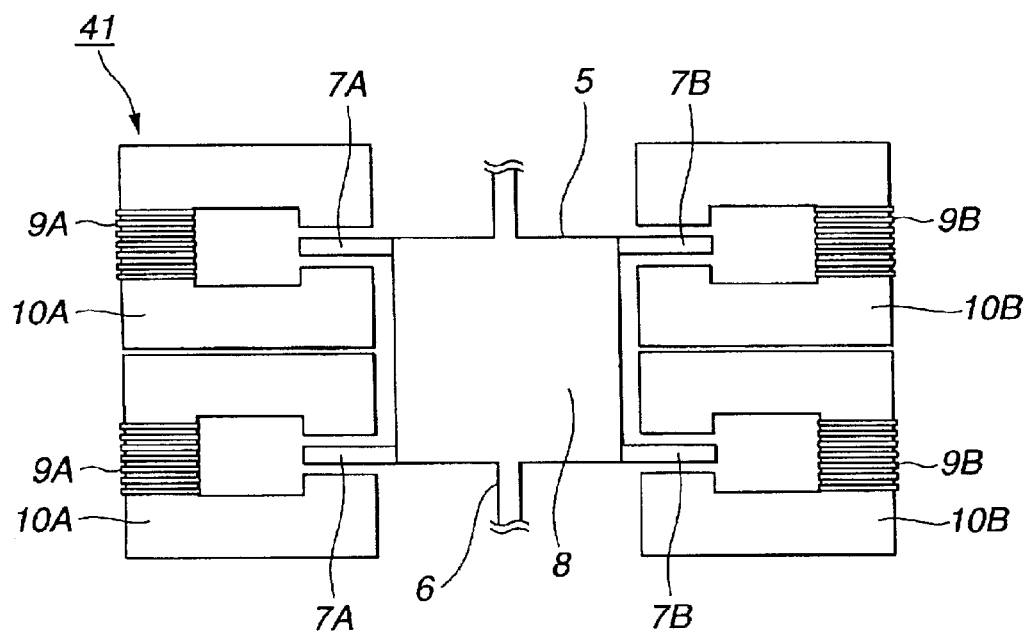
FIG. 15 is a plan view illustrating an optical deflector of a fourth embodiment according to the present invention.

An optical deflector of a fourth embodiment will be described with reference to FIG. 15. The structure of an optical deflector 41 of the fourth embodiment has the same fundamental structure as that of the first or third embodiment. First support substrate 2, spacer substrate 3 and second support substrate 4 are integrally formed by micromachining techniques. The fourth embodiment differs from the third embodiment in the shape of a movable plate 5 and locations of moving cores 7A and 7B. In the deflector 41 of the fourth embodiment, the movable plate 5 is shaped into a shape which has four protrusions extending from the periphery of a square reflective surface 8 in a direction perpendicular to the twisting longitudinal axis of torsion springs 6, as illustrated in FIG. 15. The moving cores 7A and 7B are provided on those protrusions.

The deflector 41 of this embodiment can also be fabricated by the same methods as those of the first or third embodiment. The operation principle of the thus-fabricated deflector 41 of this embodiment is basically the same as that of the first embodiment. The movable plate 5 is driven by a magnetic force in a direction in which an overlap area between opposed faces of the moving cores 7A and 7B and the stationary cores 10A or 10B, in which the magnetic flux is generated, increases.

The thus-fabricated deflector 41 of this embodiment has approximately the same technical advantages as those of the third embodiment. In addition, a moment arm is enlarged and a larger torque can be obtained in the fourth embodiment since the moving cores 7A and 7B extend in a protruding form.

Also in the structure illustrated in FIG. 15, two C-shaped stationary cores 10A and 10B and two coils 9A and 9B are provided on portions of the second support substrate 4 on opposite sides of the twisting longitudinal axis of the torsion springs 6, respectively (totally four). However, even when a single stationary core and a single coil are provided on portions of the second support substrate 4 on opposite sides of the twisting longitudinal axis of the torsion springs 6, respectively (totally two), an optical deflector operable in the same manner can be obtained. Further, even when two stationary cores 10A or 10B are provided on a portion of the second support substrate 4 on one side of the twisting longitudinal axis of the torsion springs 6, respectively (totally two), an optical deflector operable in the same manner can also be obtained.

Figure 16:
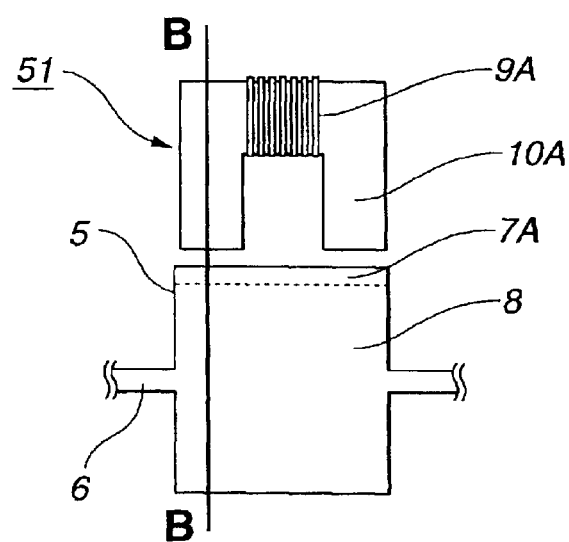
FIG. 16 is a plan view illustrating an optical deflector of a fifth embodiment according to the present invention.
Figure 17:
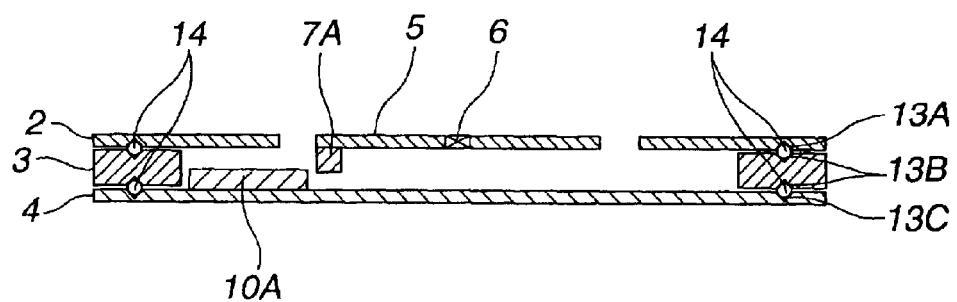
FIG. 17 is a cross-sectional view illustrating the fifth embodiment.

An optical deflector of a fifth embodiment will be described with reference to FIGS. 16 and 17. FIG. 16 is a plan view, and FIG. 17 is a cross-sectional view taken along a line B—B of FIG. 16.

The structure of an optical deflector 51 of the fifth embodiment has the same fundamental structure as that of the second embodiment. First support substrate 2, spacer substrate 3 and second support substrate 4 are integrally formed by micromachining techniques. In the deflector 51 of the fifth embodiment, a single moving core 7A is formed in a planar form on one side of the movable plate 5 parallel to the twisting longitudinal axis of the torsion springs 6, as illustrated in FIG. 16. A single U-shaped stationary core 10A and a coil 9A wound thereon for generating a magnetic flux flowing along directions parallel to the second support substrate 4 are provided on the substrate 4. Those stationary core 10A and coil 9A construct a serial magnetic circuit together with the moving core 7A.

The coil 9A is connected to a current source (not shown), and the motion of the movable plate 5 is controlled by the current source. The fifth embodiment differs from the second embodiment only in the numbers of the moving core, the stationary core and the coil. Accordingly, the deflector 51 of this embodiment can be fabricated by the same methods as those of the second embodiment.

The operation principle of the thus-fabricated deflector 51 of this embodiment is basically the same as that of the second embodiment. In the deflector 51, the moving core 7A is provided only on one side of the movable plate 5, so that a moment of inertia of the movable portion can be reduced. This structure is very advantageous for constructing an optical deflector capable of being rapidly driven.

Further, the entire device can be made compact in size since only one moving core 7A and one stationary core 10A are arranged to construct the magnetic circuit. Furthermore, it is possible that the stationary core 10A is changed to a C-shaped core to construct the magnetic circuit together with the moving core 7A as in the first embodiment. The same technical effect as that of the first embodiment can hence be obtained.

Figure 18:
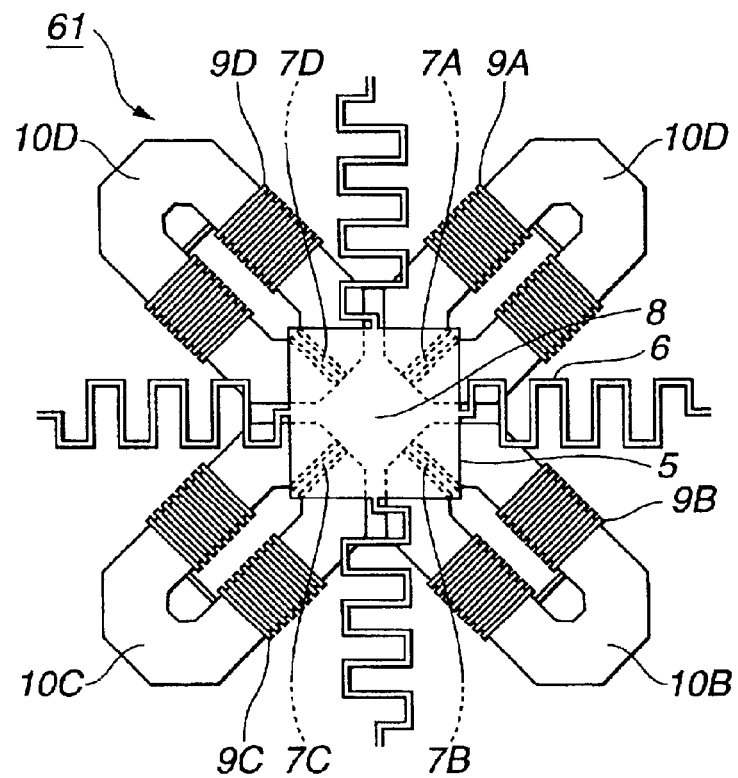
FIG. 18 is a plan view illustrating an optical deflector of a sixth embodiment according to the present invention.

An optical deflector of a sixth embodiment will be described with reference to FIG. 18. FIG. 18 is a plan view of an optical deflector 61.

The optical deflector 61 of the sixth embodiment has the same fundamental structure as that of the first embodiment. First support substrate 2, spacer substrate 3, and second support substrate 4 are integrally formed by micromachining techniques. The sixth embodiment differs from the first embodiment in the twisting direction of torsion springs 6 and the relationship between the twisting direction of the torsion springs 6 and locations of moving cores 7A, 7B, 7C and 7D. In the deflector 61 of the sixth embodiment, the torsion springs 6 are formed such that their twisting and bending vibrations can be freely achieved. The square movable plate 5 is elastically supported by four torsion springs 6 which are respectively connected to central portions of sides of the movable plate 5 and whose twisting longitudinal axes determined by the paired torsion springs 6 are orthogonal to each other.

Four moving cores 7A, 7B, 7C and 7D are formed along diagonals of the square movable plate 5 with their extending directions being shifted 45 degrees from extending directions of their adjacent torsion springs 6. C-shaped stationary cores 10A, 10B, 10C and 10D with coils 9A, 9B, 9C and 9D wound thereon are arranged such that their end faces sandwich the corresponding moving cores 7A, 7B, 7C and 7D with a spacing being interposed between the end face of the stationary core and the opposed face of the moving core, respectively.

The deflector 61 of this embodiment can be fabricated by the same methods as those of the first embodiment.

In the thus-fabricated optical deflector 61 of this embodiment, when a current is caused to flow in any of the coils 9A, 9B, 9C and 9D, the movable plate 5 is tilted about the twisting longitudinal axis extending along the moving cores 7A and 7C or moving cores 7B and 7D. Thus, a light beam can be deflected in a two-dimensional fashion by using those four coils. A driving for maintaining the attitude of the movable plate 5 can also be effected.

Figure 19:
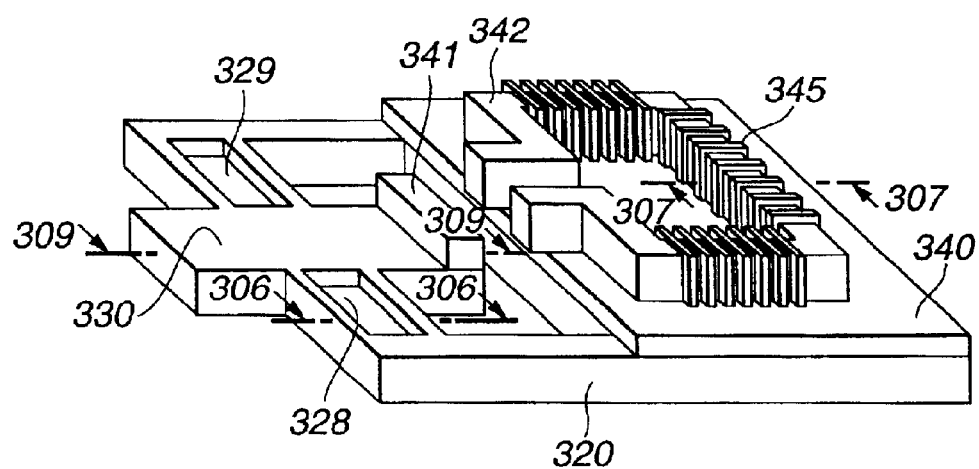
FIG. 19 is a perspective view illustrating an optical deflector of a seventh embodiment according to the present invention.
Figure 20:
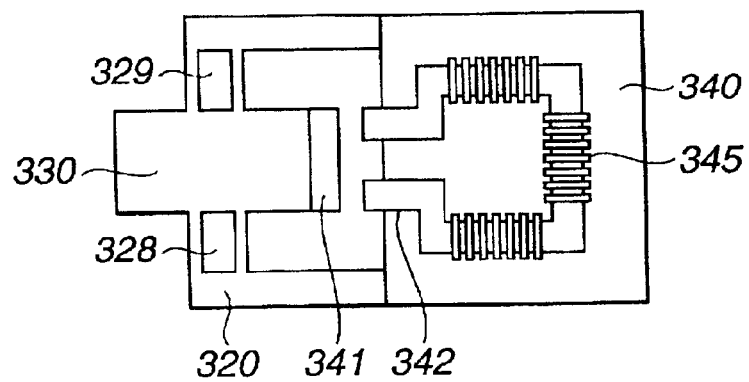
FIG. 20 is a plan view illustrating the seventh embodiment.
Figure 21:
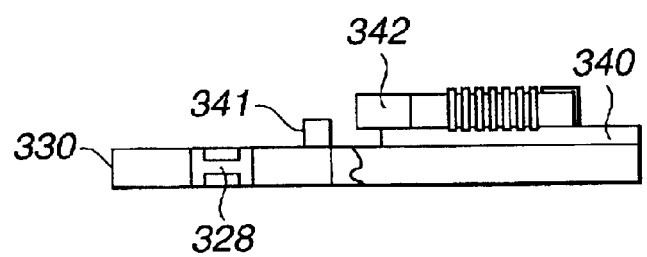
FIG. 21 is a cross-sectional view illustrating the seventh embodiment.

FIG. 19 is a perspective view illustrating a seventh embodiment of a micro-optical deflector according to the present invention. FIGS. 20 and 21 are plan and side views of FIG. 19, respectively. In FIG. 21, part of a single crystal silicon thin plate 320 is cut away to clearly show the cross section of a torsion spring 328 taken along a line 306 in FIG. 19. The seventh embodiment uses a moving core 341 formed of a hard magnetic material, while the moving core of a soft magnetic material is used in the above embodiments.

In the silicon plate 320 in the seventh embodiment of the micro-optical deflector, a pair of torsion springs 328 and 329 and a mirror 330 are integrally formed by bulk micromachining techniques. The moving core 341 of a magnetized hard magnetic material is fixed to an end portion of the mirror 330. Each of the torsion springs 328 and 329 has an H-shaped cross section, as illustrated in FIG. 21. This shape is a dodecagonal shape with four internal angles of 270 degrees and eight internal angles of 90 degrees, and is rotationally symmetric. Further, that cross section consists of a plurality of planar portions, and most compliant directions of these planar portions cross at 90 degrees. The moving core 341 is magnetized in its longitudinal direction such that the magnetic pole of its one end is N (or S) and that of its other end is S (or N). Accordingly, when ends of a stationary core 342 of an electromagnet are respectively magnetized to N and S poles, an attractive force or repulsive force is exerted on the opposite ends of the moving core 341. Hence, the mirror 330 is tilted about the twisting longitudinal axis of the torsion springs 328 and 329.

A surface of the mirror 330 is coated with a highly-reflective material, and the mirror 330 is supported by the torsion springs 328 and 329 rotatably about the twisting longitudinal axis.

The stationary core 342 of a soft magnetic material is arranged on a glass substrate 340, and a coil 345 is wound on the stationary core 342. The silicon plate 320 is bonded to the glass substrate 340 such that a predetermined distance can be set between parallel opposed faces of the moving core 341 of the mirror 330 and the stationary core 342. When the mirror 330 is tilted about the twisting longitudinal axis of the torsion springs 328 and 329, a superimposing area (i.e., a cross-sectional area where the moving core 341 crosses the magnetic flux generated by the stationary core 342) between those parallel opposed faces is changed.

Figure 22:
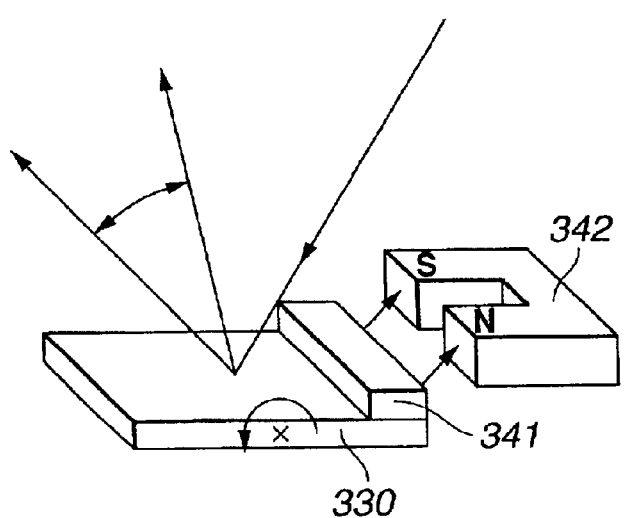
FIG. 22 is a schematic perspective view illustrating the driving principle of the seventh embodiment.

The operation of the deflector of this embodiment will be described with reference to FIG. 22. The stationary core 342 is magnetized when a current flows through the coil 345. FIG. 22 illustrates the condition under which a front end of the stationary core 342 is magnetized to the N pole and a rear end thereof is magnetized to the S pole. Here, the moving core 341 is attracted in a direction in which the above superimposing area of the opposed faces increases (i.e., the moving core 341 is attracted into a magnetic flux path generated by the stationary core 342). This direction is indicated by arrows in FIG. 22. The moving and stationary cores 341 and 342 are disposed at different levels when no current flows through the coil 345 (i.e., in the neutral state), such that the above superimposing area of the opposed faces can increase. Therefore, at this time, a rotational moment in a counterclockwise direction (see a circular arrow in FIG. 22) is created about the longitudinal axis of the torsion springs 328 and 329.

The resonance of the mirror 330 about the twisting longitudinal axis of the torsion springs 328 and 329 occurs when the current flow in the coil 345 is alternately turned on and off in accordance with the resonance frequency of the mirror 330. When a beam of light is incident on the mirror 330 under such a condition, the beam of light is scanned in a vibratory fashion.

Figure 24A:
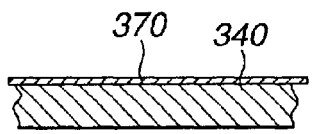
FIGS. 24A to 24N are cross-sectional views illustrating a method of fabricating a stationary core and a coil of the seventh embodiment.
Figure 24B:
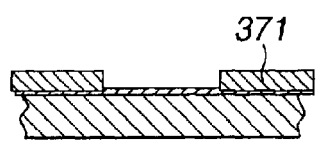

A fabrication method of the optical deflector of this embodiment will be described with reference to FIGS. 23A to 23J and FIGS. 24A to 24N. Left portions of FIGS. 23A to 23J are cross-sectional views taken along the line 306 of FIG. 19, and right portions of FIGS. 23A to 23J are cross-sectional views taken along a line 309 of FIG. 19, respectively. FIGS. 24A to 24N are cross-sectional views taken along a line 307 of FIG. 19.

The single crystal silicon plate 320 is processed in the following manner, as illustrated in FIGS. 23A to 23J.

A seed electrode layer 360 is initially deposited on a surface of the silicon plate 320, as illustrated in FIG. 23A.

A thick resist layer 361 (formed of SU-8, for example) is then deposited on the seed electrode layer 360, and its patterning for forming the moving core 341 is performed by photolithography techniques, as illustrated in FIG. 23B.

A layer 362 of a hard magnetic material is electroplated on the seed electrode layer 360, as illustrated in FIG. 23C.

The thick resist layer 361 and the seed electrode layer 360 are removed as illustrated in FIG. 23D. The seed electrode layer 360 under the hard magnetic layer 362 remains unremoved.

Mask layers 350 (formed of a resist, for example) are formed on both surfaces of the silicon plate 320, and its patterning for forming the silicon plate 320 as illustrated in FIG. 19 is performed by photolithography techniques, as illustrated in FIG. 23E.

Etching is then perpendicularly performed to a predetermined depth from both surfaces of the silicon thin plate 320 by using a deep etching method, such as ICP-RIE, as illustrated in FIG. 23F. This depth is determined by the thickness of a horizontal bridge portion of the H-shaped torsion springs 328 and 329. That thickness is about twice that depth.

After the mask layers 350 are removed, new mask layers 351 are deposited and patterned as illustrated in FIG. 23G.

Etching is again perpendicularly performed by using the deep etching method, such as ICP-RIE. The etching is conducted from the bottom surface until the previously-etched bottom surface reaches a center in thickness of the silicon plate 320, as illustrated in FIG. 23H.

Further, etching is perpendicularly performed from the top surface until the previously-etched bottom surface penetrates the silicon plate 320 as illustrated in FIG. 23I, by using the deep etching method, such as ICP-RIE. In portions of the torsion springs 328 and 329, the etching stops at a location where the bridge portions of the H-shaped torsion springs 328 and 329 having a predetermined thickness remain intact. The thickness of vertical column portions of the H-shaped torsion springs 328 and 329 is set by the width of a pair of stripe portions of the upper and lower mask layers 351. This thickness is typically equal to the thickness of the above bridge portion.

The mask layer 351 is finally removed, as illustrated in FIG. 23J.

The glass substrate 340 is processed in the following manner, as illustrated in FIGS. 24A to 24N.

A seed electrode layer 370 is formed on a surface of the glass substrate 340, as illustrated in FIG. 24A. A thick resist layer 371 is then deposited on the seed electrode layer 370, and its patterning for forming the stationary core 342 is performed as illustrated in FIG. 24B.

Figure 24C:
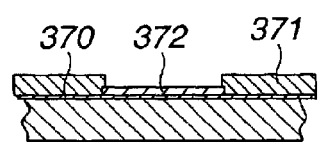
Figure 24D:
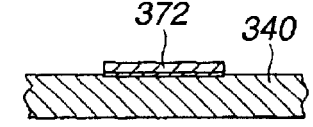

A lower wiring layer 372 of the coil 345 is electroplated on the seed electrode layer 370, as illustrated in FIG. 24C. The thick resist layer 371 and the seed electrode layer 370 other than a portion under the lower wiring layer 372 are removed, as illustrated in FIG. 24D.

Figure 24E:
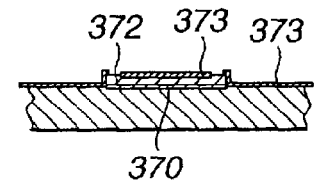

An insulating layer 373 is then formed on the lower wiring layer 372, and its patterning for forming side wiring layers 382 and 383 is performed as illustrated in FIG. 24E.

Figure 24F:
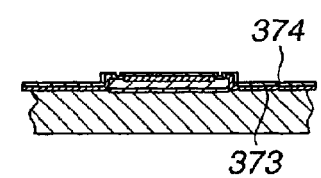
Figure 24G:
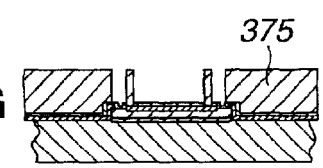

Another seed electrode layer 374 is formed on the insulating layer 373, as illustrated in FIG. 24F. Another thick resist layer 375 is then deposited on the seed electrode layer 374, and its patterning is performed such that a soft magnetic layer 376 of the stationary core 342 and the side wiring layers 382 and 383 can be formed, as illustrated in FIG. 24G.

Figure 24H:
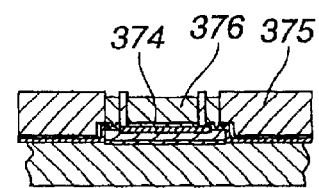

The soft magnetic layer 376 and the side wiring layers 382 and 383 are electroplated on a portion of the seed electrode layer 374 without the thick resist layer 375 thereon, as illustrated in FIG. 24H.

Figure 24I:
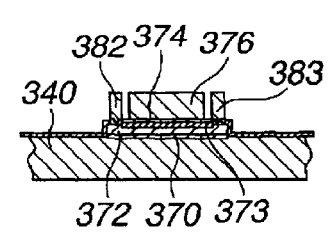

The thick resist layer 375 and the seed electrode layer 374 are removed, as illustrated in FIG. 24I.

Figure 24J:
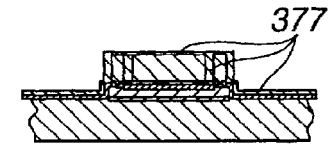

Another insulating layer 377 is then deposited, and its patterning for forming an upper wiring layer 380 is performed, as illustrated in FIG. 24J. Only portions of the insulating layer 377 on tops of the side wiring layers 382 and 383 are removed by this patterning.

Figure 24K:
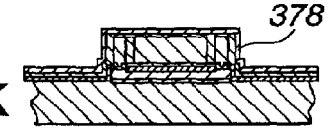
Figure 24L:
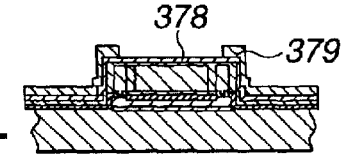

Another seed electrode layer 378 is formed on the insulating layer 377, as illustrated in FIG. 24K. Another thick resist layer 379 is deposited on the seed electrode layer 378, and its patterning is performed as illustrated in FIG. 24L. Only a portion of the thick resist layer 379 inside the side wiring layers 382 and 383 is removed by this patterning.

Figure 24M:
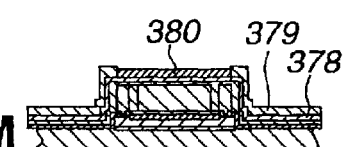
Figure 24N:
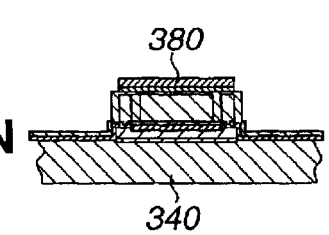

An upper wiring layer 380 is electroplated on the seed electrode layer 378, as illustrated in FIG. 24M. Finally, the thick resist layer 379 and the seed electrode layer 378 are removed, as illustrated in FIG. 24N.

The thus-fabricated single crystal silicon thin plate 320 and glass substrate 340 are bonded to build the optical deflector as illustrated in FIG. 19. At this stage, the moving core 341 has been already magnetized as discussed above.

In this embodiment, rotationally-symmetric H-shaped torsion springs are used, but other torsion springs, whose cross section perpendicular to the twisting longitudinal axis has a shape of V, reversed-V, X, slash, broken-V, broken-reversed-V, crisscross, broken-crisscross, broken-H, N, or angular S, can also be used.

Such a torsion spring has the feature that it can be readily twisted, but is hard to bend. Further, since the movable member is hard to vibrate perpendicularly to the twisting longitudinal axis at the tilting time, a highly-precise optical deflector resistant to external disturbances can be provided. In addition, its mechanical Q-value is high, and its vibration amplitude and energy efficiency can be enlarged when the resonance driving is conducted.

Figure 25A:
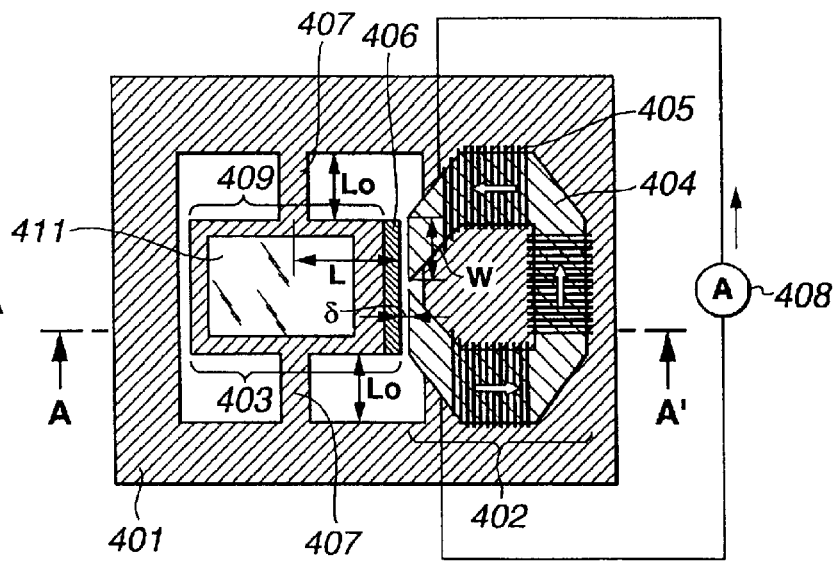
FIG. 25A is a plan view illustrating an optical deflector of an eighth embodiment according to the present invention.

An optical deflector of an eighth embodiment according to the present invention will be described with reference to FIGS. 25A and 25B. FIG. 25A is a plan view, and FIG. 25B is a cross-sectional view taken along a line A–A' of FIG. 25A.

The structure of an optical deflector of the eighth embodiment will be described. A stator 402 is composed of a stationary core 404 (the width of its end face is indicated by w in FIG. 25A) and a coil 405 wound around the core 404. The stator 402 is fixed to a support substrate 401. The stator 402 constitutes apart of a driving unit (i.e., a portion located slightly apart (this distance is indicated by δ in FIGS. 25A and 25B) from a movable member 403). Ends of the coil 405 are connected to a current source 408. The movable member 403 includes a movable plate 409, a moving core 406 and an optical deflecting element 411, and is elastically supported by a pair of torsion springs 407 (its longitudinal length is indicated by 1 in FIG. 25A) relative to the support substrate 401 such that the movable member 403 can be oscillated in a torsional fashion about the twisting longitudinal axis of the torsion springs 407. The moving core 406 also constitutes a part of the driving unit that consists of the moving core 406, the stationary core 404 and the coil 405.

The feature of this embodiment is that the moving core 406 is arranged on a side surface of the movable plate 409. This side surface of the movable plate 409 is the farthest location from the twisting longitudinal axis (this distance is indicated by L in FIG. 25A). The stationary core 404 has end faces opposite to a side surface of the moving core 406. Those end faces lie on a common plane approximately parallel to the side surface of the moving core 406.

Figure 25B:
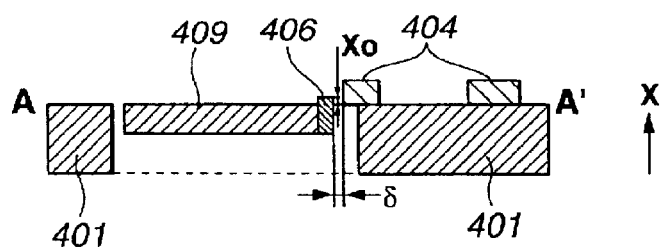
FIG. 25B is a cross-sectional view illustrating the eighth embodiment.

The stationary core 404 and the moving core 406 in its neutral state are set at different levels, and an appropriate overlap length $x_0$ is set therebetween, as illustrated in FIG. 25B. The deflecting element 411 is constructed by an optical element, such as a mirror, a lens, and a diffraction grating. The moving core 406 is disposed on a surface of the movable plate 409 approximately perpendicular to the support substrate 401. Those support substrate 401, torsion springs 407, and movable member 403 are integrally formed by semiconductor processes. The coil 405 is formed of a low-resistance metal, such as copper (Cu) and aluminum (Al), and electrically isolated from the stationary core 404. Each of the stationary core 404 and the moving core 406 is formed of a ferromagnetic material, such as nickel (Ni), iron (Fe), cobalt (Co), and their alloys, or a hard magnetic material, such as samarium-cobalt, and neodymium-iron-boron. The stationary core 404 is isolated from the coil 405 with an insulating film, such as polyimide and benzocyclobutene, interposed therebetween, or by a aerial wiring.

The operation principle of the thus-fabricated deflector with the C-shaped stationary core 404 is the same as described in the first embodiment. The oscillation of the movable member 403 about the twisting longitudinal axis is attained by a magnetic attraction of the moving core 406. The optical deflecting element 411 on the movable member 403 is continuously oscillated such that a light beam incident thereon is deflected and scanned.

A fabrication method of this embodiment will be described with reference to FIGS. 26A to 26H which are cross-sectional views corresponding to FIG. 25B. In FIGS. 26A to 26H, sizes in a vertical direction are exaggeratedly depicted to clearly illustrate the fabrication process. This is the same in other figures illustrating the fabrication processes.

A mask layer 410 of silicon oxide (about 1 $\mu$m in thickness) is initially formed on a surface of the substrate 401 of single crystal silicon by thermal oxidization. The mask layer 410 is patterned by wet etching using a hydrofluoric acid or the like, or reactive ion etching using a fluorine-contained gas, for example. In order to form a groove in the substrate 401, a portion of the substrate 401 is etched to a depth of approximately 100 $\mu$m by ICP-RIE with the patterned mask layer 410 being used as an etching mask.

Figure 26A:
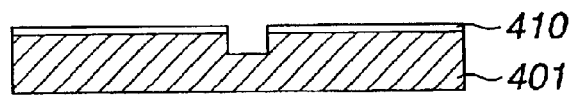
FIGS. 26A to 26H are cross-sectional views illustrating a method of fabricating the eighth embodiment.
Figure 26B:

After the mask layer 410 is removed by wet etching, or reactive ion etching, an insulating layer of silicon oxide (not shown) is deposited by using a thermal oxidization furnace, sputtering, or CVD. As a lower seed electrode 423 for electroplating, titanium (Ti) is deposited to a thickness of about 50 Å, and gold (Au) or copper (Cu) is then deposited to a thickness of about 1000 Å by vacuum-evaporation or sputtering, as illustrated in FIG. 26B. Then, a lower photoresist 415 is deposited to a thickness of about 25 $\mu$m, and patterned to form a mask for electroplating, as illustrated in FIG. 26B.

Figure 26C:

Copper (Cu) is then deposited to a thickness of about 20 $\mu$m by Cu electroplating or electroless plating to form a lower wiring 420, as illustrated in FIG. 26C. The lower photoresist 415 and exposed portions of the lower seed electrode 423 are removed by rective ion etching or ion milling. A lower insulating layer of polyimide, benzocyclobutene or the like (not shown) is then deposited, and patterned by wet etching using a strong alkaline solution, such as a tetramethyl ammonium hydroxide solution, or reactive ion etching to form a lower contact hole.

Figure 26D:
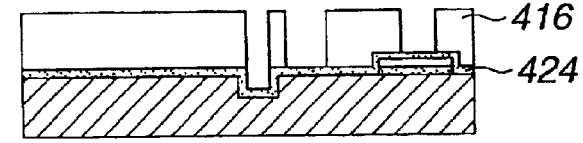

After Ti or Cr is deposited to a thickness of about 50 Å as a middle seed electrode 424 for electroplating, Au, Cu, Fe—Ni alloy, or the like is deposited to a thickness of about 1000 Å by vacuum-evaporation, sputtering or the like, as illustrated in FIG. 26D. A middle photoresist 416 is then deposited to a thickness of about 55 μm, and patterned. Here, a photoresist, such as SU-8, suitable for a thick layer can be used as the photoresist 416.

Figure 26E:
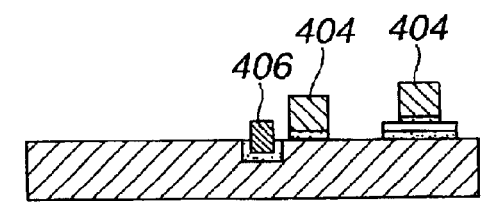

Then, as illustrated in FIG. 26E, a ferromagnetic material, such as Fe, Ni, Co, and their alloys, is electroplated to a thickness of about 50 μm with the middle photoresist 416 being used as a mask for electroplating to form the stationary core 404 and the moving core 406. The middle photoresist 416 is then removed by a heated N-methylpyrrolidone. Exposed portions of the middle seed electrode 424 are removed by reactive ion etching or ion milling.

Figure 26F:
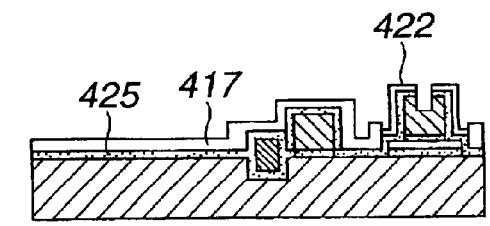

Then, as illustrated in FIG. 26F, an upper insulating layer (not shown) of polyimide, benzocyclobutene, or the like is deposited, and patterned to form an upper contact hole. The upper contact hole is formed at the location corresponding to the lower contact hole. As an upper seed electrode 425 for electroplating, Ti is deposited to a thickness of about 50 Å, and Au is then deposited to a thickness of about 1000 Å, using vacuum-evaporation or the like. An upper photoresist 417 is deposited to a thickness of about 25 μm, and patterned. Here, a photoresist, such as AZ P4620 (product of Hoechst), suitable for a thick layer can be used as the upper photoresist 417. Copper is then electroplated to a thickness of about 20 μm with the upper photoresist 417 being used as a mask to form an upper wiring 422. As a result, the upper wiring 422 is connected to the lower wiring 420 through upper and lower contact holes, and the coil 405 is thus fabricated.

Figure 26G:
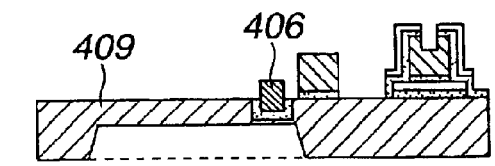

The upper photoresist 417 and exposed portions of the upper seed electrode 425 are then removed, as illustrated in FIG. 26G. A silicon oxide is then deposited on the bottom surface by sputtering or the like, and patterned to form an etching mask (not shown). Anisotropic etching is then performed on the bottom surface by using a heated potassium hydroxide solution to expose the moving core 406 (the middle seed electrode 424 may be unremoved). Thus, the movable plate 409 having a desired thickness can be formed.

Figure 26H:
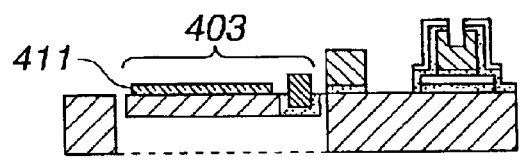

A silicon oxide is deposited on the top surface by sputtering or the like, and patterned to form an etching mask, as illustrated in FIG. 26H. ICP-RIE is then performed until the substrate 401 is penetrated, and the movable member 403 and torsion springs (not shown) are formed. Finally, the deflecting element 411 is placed on the movable member 403.

The moving core 406 can be formed near the side surface of the movable plate 409, not on the side surface itself. For example, when patterning is conducted during the step of FIG. 26H such that a portion of the movable plate 409 exists also on the side surface of the moving core 406 with the side surface of the moving core 406 opposite to the stationary core 404 not being exposed, the moving core 406 can be arranged at a location in the vicinity of the side surface of the movable plate 409. Further, the moving core 406 does not necessarily penetrate the movable plate 409. The moving core 406 can be placed in a groove whose bottom portion remains unremoved. Furthermore, such a groove may be formed on the bottom surface of the movable plate 409.

Figure 25C:
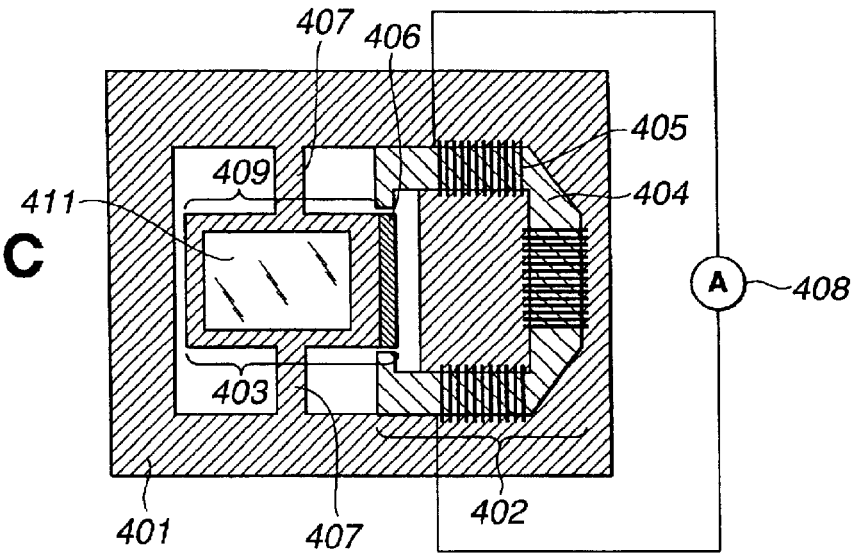
FIG. 25C is a plan view illustrating an optical deflector of a ninth embodiment according to the present invention.

An optical deflector of a ninth embodiment according to the present invention will be described with reference to FIG. 25C. A stationary core 404 of the ninth embodiment has a shape different from that of the eighth embodiment. The stationary core 404 in the ninth embodiment has opposite end faces opposed to end faces of a moving core 406, respectively. An air gap between the stationary core 404 and the moving core 406 is formed at each of the opposite end faces of the moving core 406. A troidal-type core is constructed by the moving core 406 and the stationary core 404. Other points are the same as those of the eighth embodiment.

Figure 27A:
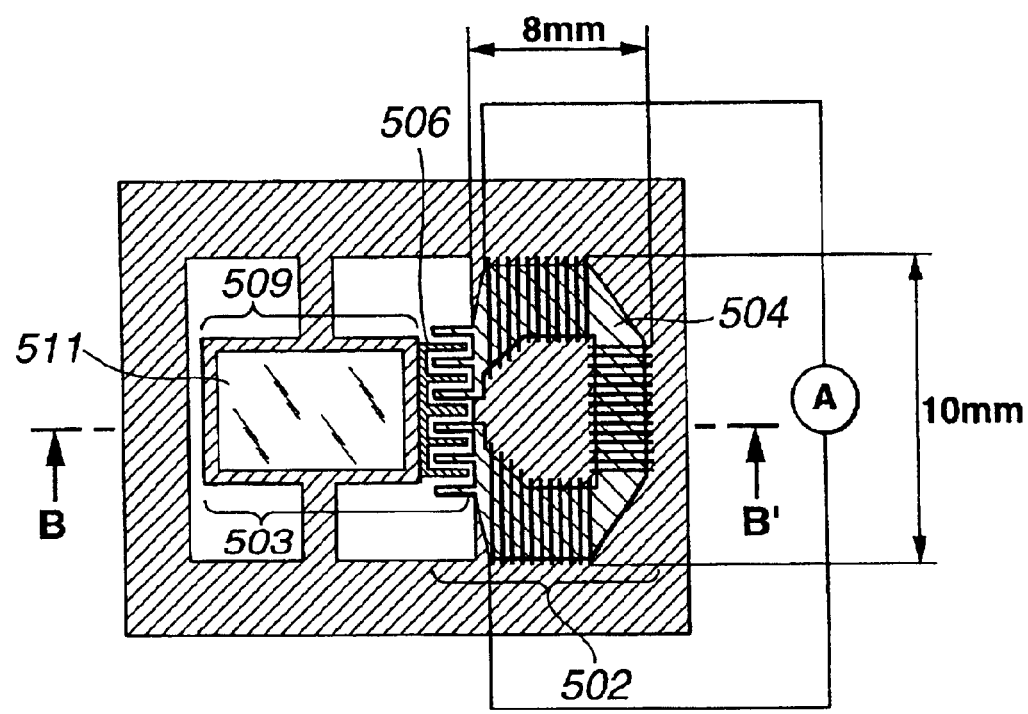
FIG. 27A is a plan view illustrating an optical deflector of a tenth embodiment according to the present invention.
Figure 27B:
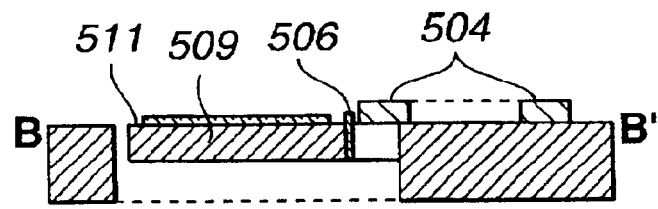
FIG. 27B is a cross-sectional view illustrating the tenth embodiment.

An optical deflector of a tenth embodiment according to the present invention will be described with reference to FIGS. 27A and 27B. FIG. 27A is a plan view, and FIG. 27B is a cross-sectional view taken along a line B–B' of FIG. 27A. Structure, driving method and fabrication method of this embodiment are basically the same as those of the eighth embodiment.

The structure of an optical deflector of the tenth embodiment will be described. A stator 502 is composed of a stationary core 504 and a coil wound around the core 504. The stator 502 is fixed to a support substrate. Ends of the coil are connected to a current source. A movable member 503 includes a movable plate 509, a moving core 506 and an optical deflecting element 511, and is elastically supported by a pair of torsion springs relative to the support substrate such that the movable member 503 can be oscillated in a torsional fashion about the twisting longitudinal axis of the torsion springs.

The feature of this embodiment is that each of the stationary core 504 and the moving core 506 has a comb-shaped portion, and the moving core 506 is arranged on a side surface of the movable plate 509. In FIG. 27A, the number of teeth in the comb portion is less than the actual number for the convenience of simplicity. Sizes of the comb-shaped portions are as follows, for example. The length of the tooth of the comb-shaped portion is 200 μm, the width of the tooth of the comb-shaped portion is 25 μm, and a spacing between the teeth of the comb-shaped portions is 25 μm. The array pitch of the teeth is 100 μm in each of the stator 502 and the movable member 503. Lengths of portions without the teeth of the stator 502 are respectively 8 mm and 10 mm as illustrated in FIG. 27A, for example.

In the tenth embodiment, the driving stroke can be enlarged without any mechanical interference between the stationary core 504 and the moving core 506 since the comb-shaped portions of the stationary core 504 and the moving core 506 are arranged with spacing being interposed between the teeth thereof. Further, an amount of shift in the thickness direction between opposed side surfaces of the stationary core 504 and the moving core 506 can be readily increased, and the deflection angle of the movable member 503 can be readily increased, since the moving core 506 is disposed on the side surface of the movable plate 509. Furthermore, the maximum opposed area between the stationary core 504 and the moving core 506 can be enlarged, and hence, the structure with a small leakage of the magnetic flux and a large energy efficiency can be attained.

Figure 28:
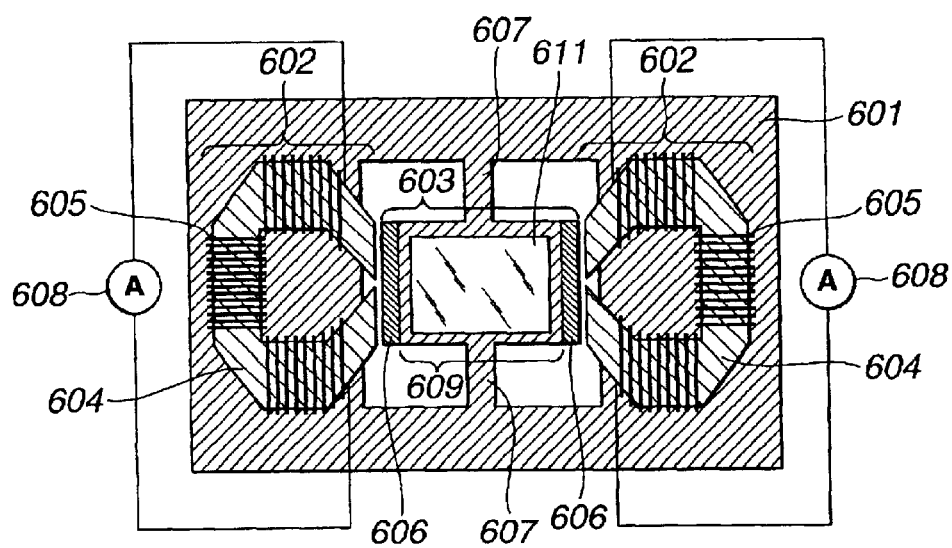
FIG. 28 is a plan view illustrating an optical deflector of an eleventh embodiment according to the present invention.

An optical deflector of an eleventh embodiment according to the present invention will be described with reference to FIG. 28. Structure, driving method and fabrication method of this embodiment are basically the same as those of the eighth embodiment.

The structure of an optical deflector of the eleventh embodiment will be described. In the eleventh embodiment, stators 602 and current sources 608 are arranged on both sides of a movable member 603 on a support substrate 601, respectively. Each stator 602 has the same structure as that of the stator 402 of the eighth embodiment.

The stator 602 is composed of a stationary core 604 and a coil 605 wound around the core 604. The stator 602 is fixed to the support substrate 601. Ends of the coil 605 are connected to the current source 608. The movable member 603 includes a movable plate 609, moving cores 606 and an optical deflecting element 611, and is elastically supported by a pair of torsion springs 607 relative to the support substrate 601 such that the movable member 603 can be oscillated in a torsional fashion about the twisting longitudinal axis of the torsion springs 607. The moving cores 606 are arranged at both side surfaces of the movable plate 609 opposingly to the respective stationary cores 604. The moving cores 606 are set parallel to the twisting longitudinal axis of the torsion springs 607. The current sources 608 can independently cause current flows in corresponding coils 605. The movable member 603 can be continuously oscillated by alternate current flows in the two coils 605 using the current sources 608. It is also possible to control the motion of the movable member 603 by sensing the displacement of the movable member 603 and changing current flows from the current sources 608. The motion of the movable member 603 can also be oppressed by adjusting timings of the current flows from the current sources 608.

In the deflector of this embodiment in which the two moving cores 606 are disposed on both side surfaces of the movable plate 609, the weight balance of the movable plate 609 in longitudinal and lateral directions is excellent, so that the inclination of the non-driven movable plate 609 relative to the support substrate 601 can be readily eliminated. Further, since the two stationary cores 604 are disposed on both sides of the movable member 603, either stationary core 604 can exert an electromagnetic force on the corresponding moving core 606 irrespective of the condition of the driven movable member 603 (i.e., irrespective of the oscillation phase of the movable member 603). Hence, the movable member 603 can be driven with a drastic stability.

Figure 29:
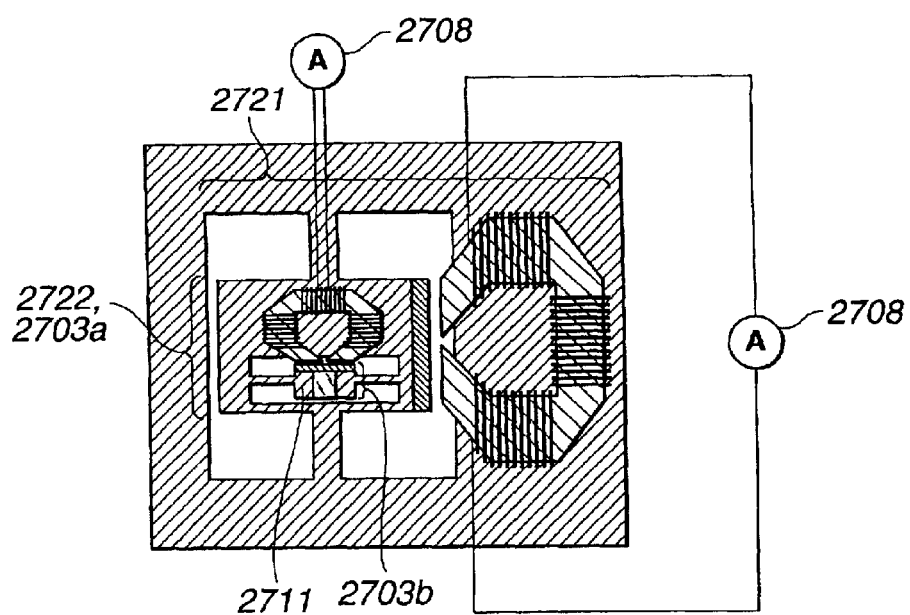
FIG. 29 is a plan view illustrating an optical deflector of a twelfth embodiment according to the present invention.

An optical deflector of a twelfth embodiment according to the present invention will be described with reference to FIG. 29. In the twelfth embodiment, two optical deflectors having the same structure as that of the eighth embodiment are arranged in a so-called gimbals fashion to perform a two-dimensional light deflection (i.e., oscillations about different twisting longitudinal axes). A larger optical deflector 721 and a smaller optical deflector 722 are arranged.

In the larger deflector 721, a stator is composed of a stationary core and a coil wound around the core. The stator is fixed to a support substrate. Ends of the coil are connected to a current source 708. A movable member 703a includes a movable plate, a moving core, and the smaller optical deflector 703a, and is elastically supported by a pair of torsion springs relative to the support substrate such that the movable member 703a can be oscillated in a torsional fashion about a first twisting longitudinal axis (extending in a vertical direction in FIG. 29) of the torsion springs. The moving core is arranged on a side surface of the movable plate opposingly to the stationary core. The moving core is set parallel to the first twisting longitudinal axis of the torsion springs.

In the smaller optical defector 722, the movable member 703a of the larger deflector 721 is used as a support substrate. An optical deflecting element of the larger deflector 721 is omitted. In the smaller deflector 722, a stator is composed of a stationary core and a coil wound around the core. The stator is fixed to the movable plate of the larger deflector 721. Ends of the coil are connected to a current source 708. A movable member 703b includes a movable plate, a moving core, and an optical deflecting element 711, and is elastically supported by a pair of torsion springs relative to the support substrate such that the movable member 703b can be oscillated in a torsional fashion about a second twisting longitudinal axis (extending in a horizontal direction in FIG. 29) of torsion springs. The moving core is arranged on a side surface of the movable plate opposingly to the stationary core. The moving core is set parallel to the second twisting longitudinal axis of the torsion springs.

The current sources 608 can independently cause current flows in corresponding coils such that the larger and smaller optical deflectors 721 and 722 can be independently driven. Accordingly, when a light beam from a light source is incident on the optical deflecting element 711, the beam is reflected and two-dimensionally deflected about the first and second twisting longitudinal axes.

The deflector of the embodiment other than the first embodiment can also be used as each of the larger and smaller deflectors 721 and 722. The thus-fabricated optical deflector of this embodiment is a two-dimensional optical deflector which can be driven with a drastic stability and a good energy efficiency.

Figure 30:
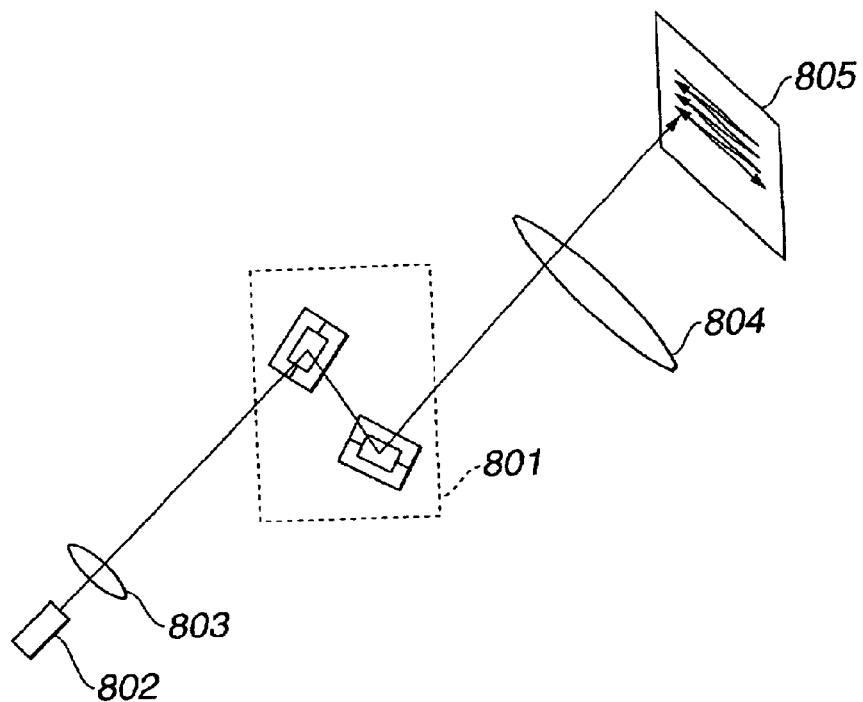
FIG. 30 is a schematic view illustrating an optical display apparatus of a thirteenth embodiment according to the present invention.

FIG. 30 illustrates a scanning type display of a thirteenth embodiment according to the present invention. In FIG. 30, reference numeral 802 designates a laser light source, reference numeral 803 designates a lens or a lens group, reference numeral 804 designates a writing lens or a writing lens group, and reference numeral 805 designates a picture display screen. An optical deflector group 801 is arranged between the two lenses or lens groups 803 and 804. The optical deflector group 801 includes two deflectors in this embodiment. The above embodiments can be used as this optical deflector. One of the deflectors deflects a light beam from the light source 802 about a first longitudinal axis, and the other deflector deflects the light beam from that deflector about a second longitudinal axis perpendicular to the first longitudinal axis. The thus-deflected light beam is projected on the screen 805 through the writing lens or lens group 804.

A controller (not shown) controls the two deflectors such that the laser beam is scanned in a raster fashion on the screen 805. The controller also controls the modulation of the laser light source 802 based on information to be displayed in a predetermined relationship with the timing of the light deflection. A picture image is thus displayed on the screen 805 in a two-dimensional manner. The sixth or twelfth embodiment can replace the optical deflector group 801.

Figure 31:
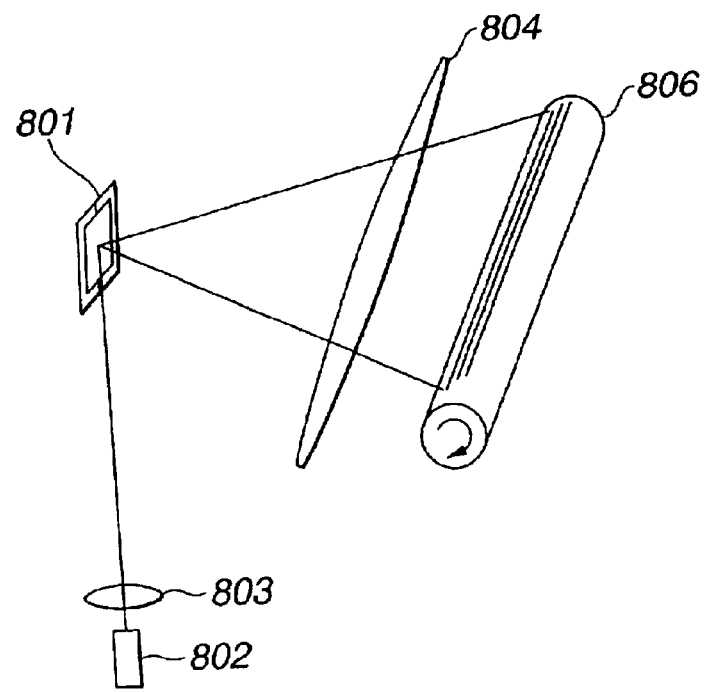
FIG. 31 is a schematic view illustrating an image forming apparatus of a fourteenth embodiment according to the present invention.

FIG. 31 illustrates an image forming apparatus of a fourteenth embodiment according to the present invention. In FIG. 31, reference numeral 806 designates a drum-shaped photosensitive body (an image forming body). An optical deflector 801 is arranged between two lenses or lens groups 803 and 804. The above embodiments can be used as this optical deflector.

The optical deflector 801 scans a light beam one-dimensionally parallel to a rotary center axis about which the drum body 806 is rotated at a predetermined constant rate. The surface of the photosensitive body 806 is uniformly charged by a charger (not shown). Based on the scanning by the deflector 801 and the rotation of the drum-shaped photosensitive body 806, the light beam is impinged on the surface of the body 806 to form a electrostatic latent image thereon. A toner image is formed by a developer (not shown), corresponding to the latent image on the drum-shaped photosensitive body 806. A visible image can be formed on a paper (not shown) by transfer and fixation.

While the present invention has been described with respect to what is presently considered to be the preferred embodiments, it is to be understood that the invention is not limited to the disclosed embodiments. The present invention is intended to cover various modifications and equivalent arrangements included within the spirit and the scope of the appended claims.

What is claimed is:

1. A movable-body apparatus comprising:
   a first support member;
   a movable body having top and bottom planar surfaces;
   supporting means having a twisting longitudinal axis, said supporting means supporting said movable body relative to said first support member; and
   driving means which tilt said movable body in a tilting direction about the twisting longitudinal axis, said driving means including a stationary portion provided apart from said movable body, and a moving core formed of a magnetic material, provided on said bottom planar surface of said movable body,
   wherein said stationary portion and said moving core have faces opposed to each other in a planar direction of said movable body, and wherein a superimposed area exists between a part of the face of said stationary portion and a part of the face of said moving core where a size of the superimposed area is changed when said movable body is tilted when viewed from said planar direction of said movable body and said superimposed area also exists directly below said bottom planar surface of said movable body.

2. The movable-body apparatus of claim 1, wherein said stationary portion of said driving means includes a stationary core formed of a soft magnetic material and a coil wound on said stationary core.

3. The movable-body apparatus of claim 1, wherein said supporting means includes a pair of torsion springs disposed along the twisting longitudinal axis opposingly with said movable body being interposed.

4. The movable body apparatus of claim 2, wherein said faces of said moving core and said stationary core are opposed to each other in an approximately parallel relationship with a spacing being interposed between said opposed faces of said moving core and said stationary core, respectively.

5. The movable-body apparatus of claim 4, wherein said moving core and said stationary core constitute a serial magnetic circuit through said spacing.

6. The movable-body apparatus of claim 1, wherein said moving core is provided on a side of a side surface of said movable body parallel to and remote from the twisting longitudinal axis.

7. The movable-body apparatus of claim 6, wherein said moving core is provided on said side surface of said movable body.

8. The movable-body apparatus of claim 2, wherein said stationary core has opposite end faces with said moving core being interposed between said opposite end faces.

9. The movable-body apparatus of claim 2, wherein said stationary core has opposite end faces lying on a common plane and opposed to said face of said moving core.

10. The movable-body apparatus of claim 1, wherein said moving core is provided on an edge portion of said movable body extending parallel to the twisting longitudinal axis.

11. The movable-body apparatus of claim 1, wherein said moving core is provided on an edge portion of said movable body extending perpendicularly to the twisting longitudinal axis.

12. The movable-body apparatus of claim 1, wherein said moving core is provided on a protruding portion of said movable body extending perpendicularly to the twisting longitudinal axis.

13. The movable-body apparatus of claim 2, wherein said moving core is provided on each edge portion of said movable body about the twisting longitudinal axis, said stationary core with said coil wound thereon is provided on each side of the twisting longitudinal axis, and said moving core and said stationary core constitutes a serial magnetic circuit on each side of the twisting longitudinal axis.

14. The movable-body apparatus of claim 2, wherein said moving core is provided on one edge portion of said movable body, said stationary core with said coil wound thereon is provided on one side of the twisting longitudinal axis, and said moving core and said stationary core constitutes a serial magnetic circuit on said one side of the twisting longitudinal axis.

15. The movable-body apparatus of claim 2, wherein said supporting means includes two sets of paired springs which are capable of torsional and flexure vibrations, whose longitudinal axes are orthogonal to each other and which elastically support said movable body in a two-dimensional torsional manner, four moving cores are provided on said movable body in a crisscross pattern extending in directions shifted by 45 degrees from each adjacent longitudinal axis of said paired springs, and four stationary cores with said coils are provided such that each corresponding moving core and stationary core constitute a serial magnetic circuit.

16. The movable-body apparatus of claim 2, further comprising a second support member for supporting said stationary core, and a spacer support member for bonding said first support member and said second support member to each other in a predetermined relationship with said spacer support member being interposed.

17. The movable-body apparatus of claim 1, wherein at least one of said supporting means and said movable body is formed of a single crystal silicon.

18. The movable-body apparatus of claim 1, wherein said moving core is formed of a ferromagnetic material.

19. The movable-body apparatus of claim 1, wherein said moving core is formed of a hard magnetic material.

20. The movable-body apparatus of claim 1, wherein said moving core is formed of an alloy including iron and nickel.

21. The movable-body apparatus of claim 1, wherein said moving core, said supporting means, and said first support member are integrally formed in a common substrate.

22. The movable-body apparatus of claim 1, wherein said stationary portion of said driving means includes a stationary core fixed to said first support member, and a coil wound on said stationary core.

23. The movable-body apparatus of claim 2, wherein each of said stationary core and said moving core includes a comb-shaped portion, and said comb-shaped portions of said stationary core and said moving core are arranged in a meshing manner with spacing being interposed between said comb-shaped portions.

24. The movable-body apparatus of claim 1, wherein said frame member includes an inner frame member and an outer frame member, said movable body includes an inner movable body and an outer movable body which is said inner frame member for supporting said inner movable body through first supporting means and is supported by said outer frame member through second supporting means, said inner movable body is supported flexibly and rotatably about a first twisting longitudinal axis of said first supporting means, and said outer movable body is supported flexibly and rotatably about a second twisting longitudinal axis of said second supporting means.

25. The movable-body apparatus of claim 24, wherein the twisting longitudinal axes extend forming an angle of 90 degrees.

26. The movable-body apparatus of claim 1, further comprising a light deflecting element provided on said movable body, and wherein said movable-body apparatus is constructed as an optical deflector.

27. The movable-body apparatus of claim 26, wherein said light deflecting element is a light reflective surface.

28. The movable-body apparatus of claim 26, wherein said light deflecting element is a diffraction grating.

29. The movable-body apparatus of claim 26, wherein said light deflecting element is a lens.

30. The movable-body apparatus of claim 1, wherein said movable-body apparatus is constructed as an actuator for actuating said movable body.

31. A scanning type display comprising:

(a) a modulatable light source;

(b) an optical deflector including:

a support member;

a movable body having top and bottom planar surfaces;

supporting means having a twisting longitudinal axis, said supporting means supporting said movable body relative to said support member;

driving means which tilt said movable body about the twisting longitudinal axis, said driving means including a stationary portion provided apart from said movable body, and a moving core formed of a magnetic material, provided on said bottom planar surface of said movable body, and having a face opposed to said stationary portion wherein said stationary portion and said moving core have faces opposed to each other in a planar direction of said movable body, and wherein a superimposed area exists between a part of the face of said stationary portion and a part of the face of said moving core where a size of te superimposed area is changed when said movable body is tilted when viewed from said planar direction of said movable body and said superimposed area also exists directly below said bottom planar surface of said movable body; and light deflecting means for deflecting a beam of light impinging on said movable body from said light source, said light deflecting means being provided on said movable body;

(c) a display screen on which the beam of light from said deflecting means is projected; and (d) control means for controlling modulation of said modulatable light source and operation of said movable body of said optical deflector in an interlocking manner.

32. An image forming apparatus comprising:

(a) a modulatable light source;

(b) an optical deflector including:

a support member;

a movable body having top and bottom planar surfaces;

supporting means having a twisting longitudinal axis, said supporting means supporting said movable body relative to said support member;

driving means which tilts said movable body about the twisting longitudinal axis, said driving means including a stationary portion provided apart from said movable body, and a moving core formed of a magnetic material, provided on a said bottom planar surface of said movable body, and having a face opposed to said stationary portion wherein said stationary portion and said moving core have faces opposed to each other in a planar direction of said movable body, and wherein a superimposed area exists between a part of the face of said stationary portion and a part of the face of said moving core where a size of te superimposed area is changed when said movable body is tilted when viewed from said planar direction of said movable body and said superimposed area also exists directly below said bottom planar surface of said movable body; and light deflecting means for deflecting a beam of light impinging on said movable body from said light source, said light deflecting means being provided on said movable body; and (c) an image forming surface on which the beam of light from said deflecting means is projected; and (d) control means for controlling modulation of said modulatable light source and operation of said movable body of said optical deflector in an interlocking manner.

33. A movable-body apparatus comprising:

a support member;

a movable body having top and bottom planar surfaces;

supporting means having a twisting longitudinal axis, said supporting means supporting said movable body relative to said support member; and driving means which tilt said movable body about the twisting longitudinal axis, said driving means including a stationary core formed of a soft magnetic material with a coil wound on said stationary core and provided apart from said movable body, and a moving core formed of a magnetic material and provided on said bottom planar surface of said movable body;

wherein said stationary portion and said moving core have faces opposed to each other in a planar direction of said movable body, and wherein a superimposed area exists between a part of the face of said stationary portion and a part of the face of said moving core where a size of te superimposed area is changed when said movable body is tilted when viewed from said planar direction of said movable body and said superimposed area also exists directly below said bottom planar surface of said movable body.

* * * * *